United States Patent
Suzuki et al.

(10) Patent No.: US 9,114,379 B2
(45) Date of Patent: Aug. 25, 2015

(54) NIOBIUM NITRIDE AND METHOD FOR PRODUCING SAME, NIOBIUM NITRIDE-CONTAINING FILM AND METHOD FOR PRODUCING SAME, SEMICONDUCTOR, SEMICONDUCTOR DEVICE, PHOTOCATALYST, HYDROGEN GENERATION DEVICE, AND ENERGY SYSTEM

(71) Applicant: Panasonic Corporation, Kadoma-shi, Osaka (JP)

(72) Inventors: Takahiro Suzuki, Osaka (JP); Takaiki Nomura, Osaka (JP); Tomohiro Kuroha, Osaka (JP); Nobuhiro Miyata, Osaka (JP); Satoru Tamura, Osaka (JP); Kenichi Tokuhiro, Osaka (JP); Kazuhito Hato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 184 days.

(21) Appl. No.: 13/983,729

(22) PCT Filed: Nov. 28, 2012

(86) PCT No.: PCT/JP2012/007639
§ 371 (c)(1),
(2) Date: Aug. 5, 2013

(87) PCT Pub. No.: WO2013/084447
PCT Pub. Date: Jun. 13, 2013

(65) Prior Publication Data
US 2014/0057187 A1 Feb. 27, 2014

(30) Foreign Application Priority Data

Dec. 7, 2011 (JP) .................................. 2011-267659
Dec. 7, 2011 (JP) .................................. 2011-267660
Feb. 20, 2012 (JP) .................................. 2012-033927

(51) Int. Cl.
*B01J 27/24* (2006.01)
*H01M 6/04* (2006.01)
(Continued)

(52) U.S. Cl.
CPC ................ *B01J 27/24* (2013.01); *B01J 19/123* (2013.01); *B01J 23/20* (2013.01); *B01J 23/6484* (2013.01);
(Continued)

(58) Field of Classification Search
USPC ................ 502/200; 429/499, 513; 252/518.1, 252/519.1, 521.5
See application file for complete search history.

(56) References Cited

U.S. PATENT DOCUMENTS 6,864,211 B2 3/2005 Domen et al.
6,878,666 B2 4/2005 Domen et al.
(Continued)

FOREIGN PATENT DOCUMENTS

CN 1929912 3/2007
JP 51-123779 10/1976
(Continued)

OTHER PUBLICATIONS

Fix, et al., "Chemical Vapor Deposition of Vanadium, Niobium, and Tantalum Nitride Thin Films", Chemistry of Materials, vol. 5, No. 5, pp. 614-619, 1993.
(Continued)

*Primary Examiner* — Patricia L Hailey
(74) *Attorney, Agent, or Firm* — Hamre, Schumann, Mueller & Larson, P.C.

(57) ABSTRACT

The present invention is a niobium nitride which has a composition represented by the composition formula $Nb_3N_5$ and in which a constituent element Nb has a valence of substantially +5. The method for producing the niobium nitride of the present invention includes the step of nitriding an organic niobium compound by reacting the organic niobium compound with a nitrogen compound gas.

6 Claims, 18 Drawing Sheets

(51) Int. Cl.

| | |
|---|---|
| *H01M 8/04* | (2006.01) |
| *H01M 8/08* | (2006.01) |
| *H01B 1/02* | (2006.01) |
| *H01B 1/06* | (2006.01) |
| *H01B 1/08* | (2006.01) |
| *B01J 19/12* | (2006.01) |
| *B01J 23/20* | (2006.01) |
| *B01J 23/648* | (2006.01) |
| *B01J 35/00* | (2006.01) |
| *B01J 37/08* | (2006.01) |
| *C01B 3/04* | (2006.01) |
| *C01B 21/06* | (2006.01) |
| *C04B 35/58* | (2006.01) |
| *C04B 35/628* | (2006.01) |
| *C04B 35/632* | (2006.01) |
| *C25B 1/00* | (2006.01) |
| *H01M 8/06* | (2006.01) |

(52) U.S. Cl.
CPC ............ *B01J 35/004* (2013.01); *B01J 37/086* (2013.01); *C01B 3/042* (2013.01); *C01B 21/0617* (2013.01); *C04B 35/58007* (2013.01); *C04B 35/62805* (2013.01); *C04B 35/62886* (2013.01); *C04B 35/6325* (2013.01); *C25B 1/003* (2013.01); *H01M 8/04216* (2013.01); *H01M 8/0656* (2013.01); *C01P 2002/85* (2013.01); *C01P 2002/88* (2013.01); *C04B 2235/3251* (2013.01); *C04B 2235/3886* (2013.01); *C04B 2235/465* (2013.01); *C04B 2235/79* (2013.01); *C04B 2235/80* (2013.01); *Y02E 60/364* (2013.01)

(56) References Cited

U.S. PATENT DOCUMENTS

| | | | |
|---|---|---|---|
| 7,670,712 B2 | 3/2010 | Ota et al. | |
| 2007/0184975 A1 | 8/2007 | Yi et al. | |
| 2009/0147445 A1* | 6/2009 | Kuriyama | 361/523 |
| 2012/0237842 A1* | 9/2012 | Suzuki et al. | 429/423 |
| 2015/0083605 A1* | 3/2015 | Tamura et al. | 205/340 |

FOREIGN PATENT DOCUMENTS

| | | | | |
|---|---|---|---|---|
| JP | 2001-000869 | | 1/2001 | |
| JP | 2002-066333 | | 3/2002 | |
| JP | 2002-233769 | | 8/2002 | |
| JP | 2003-024764 | | 1/2003 | |
| JP | 2005-133174 | * | 5/2005 | ............... C25B 9/00 |
| JP | 2005-161203 | | 6/2005 | |
| JP | 2012-020246 | | 2/2012 | |
| KR | 10-0936490 | * | 1/2010 | ............... C07F 9/00 |
| WO | 2013/084447 | * | 6/2013 | ............... C01B 21/06 |

OTHER PUBLICATIONS

Spitz, et al., "Propriétés et structure des couches minces de nitrure de niobium élaborées par pulvéerisation cathodique réeactive I. Élaboration et propriétés", Journal of the Less-Common metals, vol. 35, No. 2, Apr. 1, 1974, pp. 181-192.

Thiede, et al., "Deposition of Niobium Nitride Thin Films from *Tert*-Butylamido-*Tris*-(Diethylamido)-Niobium by a Modified Industrial MOCVD Reactor", Chemical Vapor Deposition, vol. 15, No. 10-11-12, Dec. 1, 2009, pp. 334-341.

Search Report issued in corresponding Chinese Patent Application No. 201280007502.6, issued Jul. 3, 2015, 5 pages with an English Translation.

* cited by examiner

NIOBIUM NITRIDE AND METHOD FOR PRODUCING SAME, NIOBIUM NITRIDE-CONTAINING FILM AND METHOD FOR PRODUCING SAME, SEMICONDUCTOR, SEMICONDUCTOR DEVICE, PHOTOCATALYST, HYDROGEN GENERATION DEVICE, AND ENERGY SYSTEM

This application is the United States national phase of International Application No. PCT/JP2012/076396, filed Nov. 28, 2012, and claims priority to the following Japanese Patent Applications, the disclosures of all of which are hereby incorporated in their entirety by reference: Japanese Patent Application 2012-033927, filed Feb. 20, 2012, Japanese Patent Application 2011-267660 filed Dec. 7, 2011, and Japanese Patent Application 2011-267659, filed Dec. 7, 2011.

TECHNICAL FIELD

The present invention relates to a niobium nitride and a method for producing the niobium nitride, a niobium nitride-containing film and a method for producing the niobium nitride-containing film, a semiconductor, a semiconductor device, a photocatalyst suitable for water decomposition reaction, a hydrogen generation device including the photocatalyst, and an energy system including the hydrogen generation device.

BACKGROUND ART

Conventionally, water is decomposed into hydrogen and oxygen by irradiating a semiconductor material serving as a photocatalyst with light.

For example, Patent Literature 1 discloses a method in which an n-type semiconductor electrode and a counter electrode are disposed in an electrolytic solution and the surface of the n-type semiconductor electrode is irradiated with light to obtain hydrogen and oxygen from the surfaces of these electrodes. Patent Literature 1 describes the use of a $TiO_2$ electrode, a ZnO electrode, or the like as the n-type semiconductor electrode.

Patent Literature 2 discloses a gas generator including a metal electrode and a nitride semiconductor electrode that are connected to each other and are disposed in a solvent. Patent Literature 2 describes the use of a nitride of a Group 13 element such as indium, gallium or aluminum for the nitride semiconductor electrode.

These conventional semiconductor electrodes have a problem of low hydrogen generation efficiency in water decomposition reaction by sunlight irradiation. The reason for this is as follows. Semiconductor materials such as $TiO_2$ and ZnO can absorb only short wavelength light, that is, light having a wavelength of approximately 400 nm or less. Therefore, only a very small fraction of the total sunlight can be utilized. For example, when $TiO_2$ is used, only about 4.7% of sunlight can be utilized. Furthermore, in view of a theoretical loss of the absorbed light due to heat loss, the sunlight utilization efficiency is only about 1.7%.

Patent Literature 3 discloses a photocatalyst containing an orthorhombic tantalum nitride as a semiconductor material capable of absorbing longer wavelength visible light. Patent Literature 3 also reports that tantalum nitride $Ta_3N_5$ can absorb light having a wavelength of 600 nm or less. However, the light having a wavelength of 600 nm or less accounts for only about 16% of the total sunlight. Furthermore, in view of a theoretical heat loss, the utilization efficiency is only about 6%.

CITATION LIST

Patent Literature

Patent Literature 1 JP 51 (1976)-123779 A
Patent Literature 2 JP 2003-024764 A
Patent Literature 3 JP 2002-233769 A

SUMMARY OF INVENTION

Technical Problem

In order to decompose water by irradiating a semiconductor material with light, the band edges (the level of the top of the valence band and the level of the bottom of the conduction band) of the semiconductor material need to be located at levels between which the oxidation-reduction potential of water (the level of oxygen evolution and the level of hydrogen evolution) is present. Therefore, the requirements for a semiconductor material that can be practically used for water decomposition are that: the semiconductor material must be able to absorb longer wavelength light (the semiconductor material must have a smaller band gap); the band edges of the semiconductor material must be located at levels between which the oxidation-reduction potential of water is present; and the semiconductor material must be stable in water under light irradiation. However, semiconductor materials that meet all of these requirements have not been found.

Thus, it is an object of the present invention to provide a substance that can be used as a semiconductor material capable of absorbing longer wavelength light (having a smaller band gap), having band edges at levels between which the oxidation-reduction potential of water is present, and having high stability in water under light irradiation.

Solution to Problem

The present invention provides a niobium nitride which has a composition represented by the composition formula $Nb_3N_5$ and in which the constituent element Nb has a valence of substantially +5.

Advantageous Effects of Invention

The niobium nitride of the present invention is a novel substance, and can be used as a semiconductor material capable of absorbing longer wavelength light (having a smaller band gap), having band edges at levels between which the oxidation-reduction potential of water is present, and having high stability in water under light irradiation.

DESCRIPTION OF EMBODIMENTS

In order to decompose water efficiently using sunlight so as to generate hydrogen, a material used as a photocatalyst needs to be a semiconductor material capable of absorbing relatively long wavelength visible light (having a narrow band gap width), having band edges (the level of the top of the valence band and the level of the bottom of the conduction band) located at levels between which the oxidation potential and reduction potential of water are present, and being stable in an aqueous solution under light irradiation.

How large the band gap should be to achieve a hydrogen generation efficiency comparable to that of a now commonly used Si-based solar cell is discussed below. In the case of a semiconductor material capable of absorbing light having a wavelength of 700 nm or less, about 48% of the total sunlight can be utilized. In view of a theoretical loss of this fraction of light due to heat loss, the hydrogen generation efficiency is about 25%. This is the value obtained on the assumption that the quantum efficiency is 100%. Therefore, if the semiconductor material is incorporated into a device, other losses due to a decrease in the quantum efficiency, reflection and scattering of light on the glass surface, absorption of light by water, etc. need to be considered. Also taking into consideration these efficiencies (quantum efficiency: 90%, efficiency due to device design factors such as reflection and scattering: 90%), it can be presumed that the semiconductor material with a band gap of 700 nm achieves a hydrogen generation efficiency of about 20% at most. When the hydrogen generation efficiency is low, the installation area naturally must be increased to generate a required amount of hydrogen. The increase in the installation area not only causes an increase in cost but also makes it difficult to install the device, unlike a solar cell, in a place with a limited area, such as the roof of a detached house. The estimated power generation efficiency that a simple type (not a tandem type) Si-based solar cell can achieve is about 20%. Therefore, a semiconductor material with a band gap of 700 nm or more needs to be used to obtain an efficiency equal to or higher than that of the solar cell. In addition, since the water decomposition voltage is about 1.23 V, a semiconductor material with a band gap smaller than 1.23 V (1010 nm or more in terms of wavelength) cannot be used to decompose water in principle. Therefore, it is desired to find a semiconductor material having a band gap width of 1.23 to 1.77 eV (700 nm to 1010 nm in terms of wavelength, the same applies hereinafter).

Figure 1:
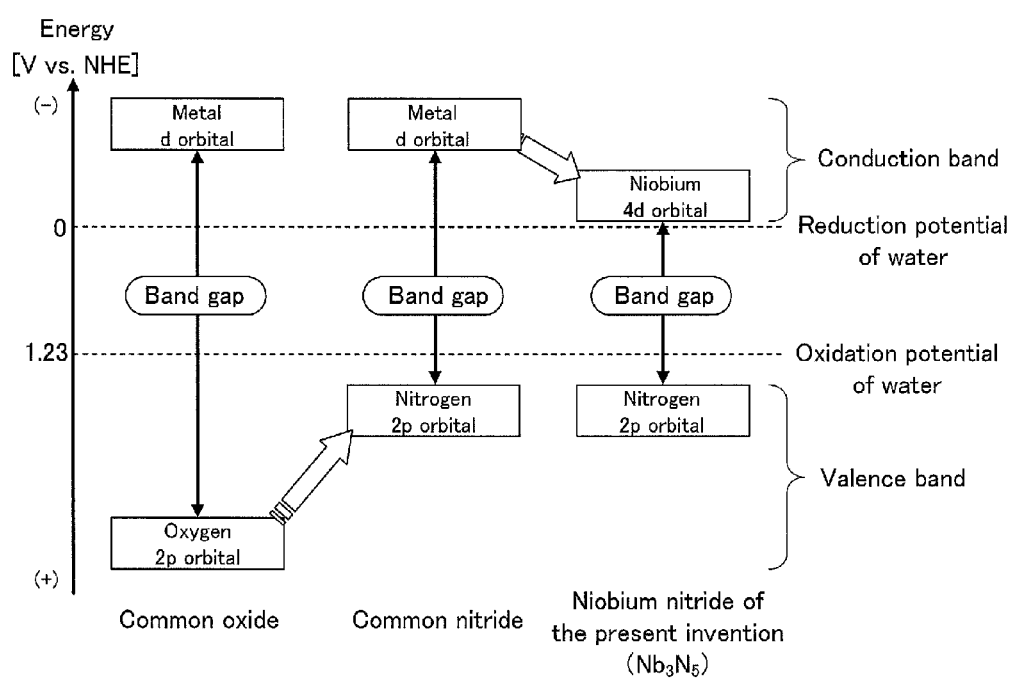
FIG. 1 is a conceptual diagram illustrating the energy levels of the niobium nitride of the present invention and conventional semiconductor materials.

Here, the valence band of a common oxide mainly consists of oxygen 2$p$ orbitals, and the level of the top of the valence band of the oxide is usually located at about +3V (relative to NHE) (left of FIG. 1). On the other hand, the valence band of a nitride mainly consists of nitrogen 2p orbitals. Therefore, the level of the top of the valence band of the nitride is usually located on the negative side of that of the top of the valence band of the oxide (center of FIG. 1). Therefore, as disclosed in Patent Literature 3, the use of a nitride makes it possible to obtain a semiconductor material having a smaller band gap than a material obtained using an oxide. Tantalum nitride ($Ta_3N_5$) is one of the nitride semiconductor materials which are reported to have a photocatalytic function of decomposing water to generate hydrogen and can absorb the longest wavelength light among these materials, but the wavelength of the light that $Ta_3N_5$ can absorb is about 600 nm at most. This is smaller than the wavelength of 700 nm, at which the efficiency equal to or higher than that of a solar cell can be obtained.

Under these circumstances, the present inventors have found, from the result of the first-principles (ab initio) calculation using a density functional theory, that a niobium nitride $Nb_3N_5$ obtained by substituting all the Ta sites of $Ta_3N_5$ by Nb is a semiconductor material having a band gap width of a value between 1.23 and 1.77 eV (700 nm to 1010 nm). This is because the Nb 4d orbitals that are the primary components of the bottom of the conduction band of $Nb_3N_5$ are located at a level on the electrochemically positive side of the Ta 5d orbitals that are the primary components of the bottom of the conduction band of $Ta_3N_5$ (right of FIG. 1). As a result of the calculation, the calculated band gap width of $Ta_3N_5$ was 1.1 eV, while the calculated band gap width of $Nb_3N_5$ was 0.8 eV, as shown in Table 1. One of the features of the first-principles calculation using the density functional theory is that the calculated band gap width is usually estimated to be smaller than the actual band gap width. However, in this calculation, the comparative evaluation of the band gap widths can be made with high accuracy, and the orbital components that constitute respective bands (such as the valence band and the conduction band) can also be determined with high accuracy. In Table 1, the calculated value of the band gap width of $Ta_3N_5$ is underestimated to be 52% of the measured value thereof. The actual band gap width of $Nb_3N_5$ of the present invention is calculated by applying this ratio to the calculated value of the band gap width of 0.8 eV using the following formula 1. According to the following formula 1, the band gap width of $Nb_3N_5$ is considered to be about 1.5 eV. This means that $Nb_3N_5$ has a capacity enough to absorb light having a wavelength of 700 nm or more.

TABLE 1

| | Band gap width | |
|---|---|---|
| | Calculated value | Measured value |
| $Ta_3N_5$ | 1.1 | 2.1 |
| $Nb_3N_5$ | 0.8 | 1.6* |

*Measured value of $Nb_3N_5$ synthesized and analyzed in Example 1-1

$$0.8 \text{ eV}/52\% = 1.5 \text{ eV} \quad \text{(Formula 1)}$$

The present inventors have also found, from the result of the first-principles calculation, that niobium in the niobium nitride exhibits the properties of a semiconductor with a band gap when niobium has a valence of +5, which is the highest valence of niobium, and that niobium having a lower valence than the highest valence has a higher electron density in the conduction band, and as a result, it has no apparent band gap. Therefore, it is preferable that niobium in the niobium nitride of the present invention have a valence of substantially +5 (preferably, a valence of +4.8 to +5). More specifically, in the niobium nitride of the present invention, the conduction band mainly consists of Nb 4d orbitals. Therefore, it is desirable that the niobium has a valence of +5, in which no electrons are present in the 4d orbitals. The present inventors have found, from the first-principles calculation, that a niobium nitride in which niobium has a valence of 3 exhibits metallic conductivity and has no band gap because electrons are present in the Nb 4d orbitals of the conduction band. However, niobium may sometimes have a valence of about +4.8 due to unavoidable defects in manufacture, and the like. In this case, the defects act as a recombination center of photoexcited carriers and slightly decrease the excitation efficiency and mobility of carriers, but do not have a significant influence on the semiconductor properties. Therefore, in the present invention, such a decrease in the valence of niobium due to unavoidable defects in manufacture is acceptable as long as niobium has a valence of about +4.8 or higher. In other words, the phrase "niobium has a valence of substantially +5" means that niobium having a valence of about +5 is acceptable as long as that valence value does not have a significant influence on the semiconductor properties, that is, niobium preferably has a valence of +4.8 to +5.

A first aspect of the present invention has been found as a result of the above studies and provides a niobium nitride which has a composition represented by the composition formula $Nb_3N_5$ and in which a constituent element Nb has a valence of substantially +5. The niobium nitride according to the first aspect is a novel substance, and can be used as a semiconductor material capable of absorbing longer wavelength light (having a smaller band gap), having band edges at levels between which the oxidation-reduction potential of water is present, and having high stability in water under light irradiation. That is, the first aspect of the present invention can provide a semiconductor material having better optical semiconductor properties for obtaining hydrogen and oxygen through decomposition of water than conventional semiconductor materials (having a smaller band gap and a higher sunlight utilization efficiency than conventional semiconductor materials).

As a result of intensive studies, the present inventors have also provided a method for producing the niobium nitride according to the first aspect and a semiconductor containing such a substance. The present inventors have further provided a film containing the niobium nitride according to the first aspect and a method for producing the film. The present inventors have further provided a semiconductor device, a photocatalyst, a hydrogen generation device, and an energy system each utilizing such a semiconductor or film.

A second aspect of the present invention provides a semiconductor containing the niobium nitride according to the first aspect. Since the semiconductor according to the second aspect contains the niobium nitride according to the first aspect, it can absorb longer wavelength light (has a smaller band gap), has band edges at levels between which the oxidation-reduction potential of water is present, and has high stability in water under light irradiation.

A third aspect of the present invention provides a semiconductor as set forth in the second aspect, wherein the semiconductor is an optical semiconductor. The semiconductor according to the third aspect not only can be used in water but also can achieve a higher sunlight utilization efficiency than conventional optical semiconductors. The "optical semiconductor" in the third aspect of the present invention is defined as a material not only having an electric conductivity within the range of electric conductivity values of semiconductors but also having a band structure in which the conduction band is substantially empty of electrons.

A fourth aspect of the present invention provides a method for producing a niobium nitride, including the step of nitriding an organic niobium compound by reacting the organic niobium compound with a nitrogen compound gas. The production method according to the fourth aspect makes it possible to synthesize the niobium nitride according to the first aspect.

A fifth aspect of the present invention provides a method for producing a niobium nitride as set forth in the fourth aspect, wherein the organic niobium compound contains a compound represented by the composition formula $Nb(NR_2)_5$, where R is an alkyl group having 1 to 3 carbon atoms. The production method according to the fifth aspect makes it easier to synthesize the niobium nitride according to the first aspect.

A sixth aspect of the present invention provides a method for producing a niobium nitride as set forth in the fifth aspect, wherein the organic niobium compound contains pentakis (dimethylamino)niobium $(Nb(N(CH_3)_2)_5)$. The production method according to the sixth aspect makes it easier to synthesize the niobium nitride according to the first aspect.

A seventh aspect of the present invention provides a method for producing a niobium nitride as set forth in any one of the fourth to sixth aspects, wherein a reaction temperature in the nitriding step is equal to or higher than a nitridation onset temperature of the organic niobium compound and is lower than a reduction onset temperature of Nb. The production method according to the seventh aspect makes it possible to nitride the organic niobium compound while preventing reduction of niobium, and thus makes it easier to synthesize the niobium nitride according to the first aspect.

A eighth aspect of the present invention provides a method for producing a niobium nitride as set forth in the seventh aspect, wherein the organic niobium compound contains pentakis(dimethylamino)niobium ($Nb(N(CH_3)_2)_5$), and the reaction temperature in the nitriding step is 120° C. to 250° C. The production method according to the eighth aspect makes it possible, when the organic niobium compound contains pentakis(dimethylamino)niobium, to nitride pentakis(dimethylamino)niobium while preventing reduction of niobium, and thus makes it easier to synthesize the niobium nitride according to the first aspect.

A ninth aspect of the present invention provides a method for producing a niobium nitride as set forth in any one of the fourth to eighth aspects, wherein a concentration of water and oxygen contained in the nitrogen compound gas is 10 ppm by volume or less. Some of the organic niobium compounds used as starting materials are highly reactive with water and oxygen. Therefore, a high content of water and oxygen in the synthesis system may cause oxidation of the organic niobium compound during the synthesis process. The production method according to the ninth aspect makes it possible to inhibit oxidation of the organic niobium compound during the synthesis process, and thus makes it easier to synthesize the niobium nitride according to the first aspect.

A tenth aspect of the present invention provides a method for producing a niobium nitride as set forth in any one of the fourth to ninth aspects, wherein a flow rate of the nitrogen compound gas used in the nitriding step is 0.10 m minute$^{-1}$ to 10.0 m minute$^{-1}$ as a linear flow rate. The production method according to the tenth aspect makes it easier to synthesize the niobium nitride according to the first aspect.

An eleventh aspect of the present invention provides a method for producing a niobium nitride as set forth in any one of the fourth to tenth aspects, wherein the nitrogen compound gas used in the nitriding step contains at least ammonia. The production method according to the eleventh aspect makes it easier to synthesize the niobium nitride according to the first aspect.

A twelfth aspect of the present invention provides a method for producing a niobium nitride as set forth in the fourth aspect, wherein the organic niobium compound contains a compound represented by the composition formula $R^1N=Nb(NR^2R^3)_3$, where $R^1$, $R^2$ and $R^3$ are each independently a hydrocarbon group, and the nitrogen compound gas contains ammonia. The production method according to the twelfth aspect makes it easier to synthesize the niobium nitride according to the first aspect.

A thirteenth aspect of the present invention provides a method for producing a niobium nitride as set forth in the twelfth aspect, wherein a reaction temperature in the nitriding step is equal to or higher than a nitridation onset temperature of the organic niobium compound and is lower than a reduction onset temperature of Nb. The production method according to the thirteenth aspect makes it easier to synthesize the niobium nitride according to the first aspect.

A fourteenth aspect of the present invention provides a method for producing a niobium nitride as set forth in the twelfth aspect or the thirteenth aspect, wherein $R^1$ is a tertiary butyl group (—$C(CH_3)_3$), and $R^2$ and $R^3$ are each independently a straight-chain alkyl group (n-$C_nH_{2n+1}$, where n is an integer of 1 or more). Since $R^1$ is a tertiary butyl group (—$C(CH_3)_3$), the resulting organic niobium compound as a raw material is a liquid, thus is easy to handle, and easily undergoes a homogeneous reaction, and further the reduction onset temperature of Nb is increased. In addition, since $R^2$ and $R^3$ are each a straight-chain alkyl group, the reduction onset temperature of Nb is increased. Therefore, the production method according to the fourteenth aspect makes it easier to synthesize the niobium nitride according to the first aspect.

A fifteenth aspect of the present invention provides a semiconductor device including the semiconductor according to the second aspect or the third aspect. Since the semiconductor device according to the fifteenth aspect includes the semiconductor according to the second aspect or the third aspect, it can be used as a device having a high sunlight utilization efficiency and being usable in water.

A sixteenth aspect of the present invention provides a photocatalyst consisting of the semiconductor according to the third aspect. Since the photocatalyst according to the sixteenth aspect consists of the semiconductor serving as an optical semiconductor according to the third aspect, it not only can be used in water but also can achieve a higher sunlight utilization efficiency than conventional photocatalysts.

A seventeenth aspect of the present invention provides a hydrogen generation device including: the photocatalyst according to the sixteenth aspect; an aqueous solution containing an electrolyte and being in contact with the photocatalyst; and a container containing the photocatalyst and the aqueous solution, wherein hydrogen is generated through decomposition of water in the aqueous solution by irradiation of the photocatalyst with light. The hydrogen generation device according to the seventeenth aspect can achieve more efficient generation of hydrogen than conventional devices.

An eighteenth aspect of the present invention provides an energy system including: the hydrogen generation device according to the seventeenth aspect; a fuel cell; and a line for supplying the hydrogen generated in the hydrogen generation device to the fuel cell. The energy system according to the eighteenth aspect can achieve more efficient generation of energy than conventional systems.

A nineteenth aspect of the present invention provides a niobium nitride-containing film containing a niobium nitride which has a composition represented by the composition formula $Nb_3N_5$ and in which a constituent element Nb has a valence of substantially +5. The niobium nitride-containing film according to the nineteenth aspect contains a niobium nitride which has a composition represented by the composition formula $Nb_3N_5$ and in which a constituent element Nb has a valence of substantially +5, like the niobium nitride according to the first aspect. Therefore, the niobium nitride-containing film according to the nineteenth aspect can absorb longer wavelength light (has a smaller band gap), has band edges at levels between which the oxidation-reduction potential of water is present, and has high stability in water under light irradiation.

A twentieth aspect of the present invention provides a method for producing a niobium nitride-containing film containing a niobium nitride which has a composition represented by the composition formula $Nb_3N_5$ and in which a constituent element Nb has a valence of substantially +5, the method including the steps of (I) vaporizing an organic niobium compound; and (II) bringing the vaporized organic niobium compound and a nitrogen compound gas into contact with a heated substrate. The production method according to the twentieth aspect makes it possible to produce the niobium nitride-containing film according to the nineteenth aspect.

A twenty-first aspect of the present invention provides a method for producing a niobium nitride-containing film as set forth in the twentieth aspect, wherein the organic niobium compound contains a compound represented by the composition formula $Nb(NR^2)_5$, where R is an alkyl group having 1 to 3 carbon atoms, and the nitrogen compound gas contains ammonia. The production method according to the twenty-first aspect makes it easier to produce the niobium nitride-containing film according to the nineteenth aspect.

A twenty-second aspect of the present invention provides a method for producing a niobium nitride-containing film as set forth in the twenty-first aspect, wherein in the step (II), the substrate is heated to a temperature that is equal to or higher than a nitridation onset temperature of the organic niobium compound and is lower than a reduction onset temperature of Nb. The production method according to the twenty-second aspect makes it easier to produce the niobium nitride-containing film according to the nineteenth aspect.

A twenty-third aspect of the present invention provides a method for producing a niobium nitride-containing film as set forth in the twentieth aspect or the twenty-first aspect, wherein the organic niobium compound contains pentakis(dimethylamino)niobium ($Nb(N(CH_3)_2)_5$). The production method according to the twenty-third aspect makes it easier to produce the niobium nitride-containing film according to the nineteenth aspect.

A twenty-fourth aspect of the present invention provides a method for producing a niobium nitride-containing film as set forth in the twentieth aspect, wherein the organic niobium compound contains a compound represented by the composition formula $R^1N=Nb(NR^2R^3)_3$, where $R^1$, $R^2$ and $R^3$ are each independently a hydrocarbon group, and the nitrogen compound gas contains ammonia. The production method according to the twenty-fourth aspect makes it easier to produce the niobium nitride-containing film according to the nineteenth aspect.

A twenty-fifth aspect of the present invention provides a method for producing a niobium nitride-containing film as set forth in the twenty-fourth aspect, wherein in the step (II), the substrate is heated to a temperature that is equal to or higher than a nitridation onset temperature of the organic niobium compound and is lower than a reduction onset temperature of Nb. The production method according to the twenty-fifth aspect makes it easier to produce the niobium nitride-containing film according to the nineteenth aspect.

A twenty-sixth aspect of the present invention provides a method for producing a niobium nitride-containing film as set forth in the twenty-fourth aspect or the twenty-fifth aspect, wherein $R^1$ is a tertiary butyl group (—$C(CH_3)_3$), and $R^2$ and $R^3$ are each independently a straight-chain alkyl group (n-$C_nH_{2n+1}$, where n is an integer of 1 or more). Since $R^1$ is a tertiary butyl group (—$C(CH_3)_3$), the resulting organic niobium compound as a raw material is a liquid, thus is easy to handle, is easily vaporized, and easily undergoes a homogeneous reaction, and further the reduction onset temperature of Nb is increased. In addition, since $R^2$ and $R^3$ are each a straight-chain alkyl group, the reduction onset temperature of Nb is increased. Therefore, the production method according to the twenty-sixth aspect makes it easier to produce the niobium nitride-containing film according to the nineteenth aspect.

A twenty-seventh aspect of the present invention provides a semiconductor device including the niobium nitride-containing film according to the nineteenth aspect. Since the semiconductor device according to the twenty-seventh aspect includes the niobium nitride-containing film according to the nineteenth aspect, it can be used as a device having a high sunlight utilization efficiency and being usable in water.

A twenty-eighth aspect of the present invention provides a photocatalyst consisting of the niobium nitride-containing film according to the nineteenth aspect. Since the photocatalyst according to the twenty-eighth aspect consists of the niobium nitride-containing film according to the nineteenth aspect, it not only can be used in water but also can achieve a higher sunlight utilization efficiency than conventional photocatalysts.

A twenty-ninth aspect of the present invention provides a hydrogen generation device including: the photocatalyst according to the twenty-eighth aspect; an aqueous solution containing an electrolyte and being in contact with the photocatalyst; and a container containing the photocatalyst and the aqueous solution, wherein hydrogen is generated through decomposition of water in the aqueous solution by irradiation of the photocatalyst with light. The hydrogen generation device according to the twenty-ninth aspect can achieve more efficient generation of hydrogen than conventional devices.

A thirtieth aspect of the present invention provides an energy system including: the hydrogen generation device according to the twenty-ninth aspect; a fuel cell; and a line for supplying the hydrogen generated in the hydrogen generation device to the fuel cell. The energy system according to the thirtieth aspect can achieve more efficient generation of energy than conventional systems.

Hereinafter, embodiments of a niobium nitride which can be used as a semiconductor material, which has a composition represented by the composition formula $Nb_3N_5$, and in which the constituent element Nb has a valence of substantially +5 and a method for producing the niobium nitride, embodiments of a niobium nitride-containing film containing the niobium nitride and a method for producing the niobium nitride-containing film, and further embodiments of a device, etc. utilizing the niobium nitride or the niobium nitride-containing film are described with reference to drawings and a table. The following embodiments are merely examples, and the present invention is not limited to the following embodiments.

(First Embodiment)

A niobium nitride according to a first embodiment of the present invention has a composition represented by the composition formula $Nb_3N_5$, and a constituent element Nb has a valence of substantially +5. This niobium nitride is synthesized by the following method.

The niobium nitride of the present embodiment can be synthesized by a method including the nitriding step of nitriding an organic niobium compound by reacting the organic niobium compound with a nitrogen compound gas.

As the organic niobium compound, a compound having a composition represented by the composition formula $Nb(NR_2)_5$, where R is an alkyl group having 1 to 3 carbon atoms, preferably 1 to 2 carbon atoms, is suitably used. Among such compounds, pentakis(dimethylamino)niobium ($Nb(N(CH_3)_2)_5$) is particularly preferred. Preferably, the organic niobium compound as the starting material contains $Nb(NR^2)_5$, and more preferably it consists of $Nb(NR^2)_5$.

As the nitrogen compound gas, for example, ammonia, nitrogen, hydrazine, or the like can be used. Among these, a nitrogen compound gas containing at least ammonia is preferably used.

Figure 2:
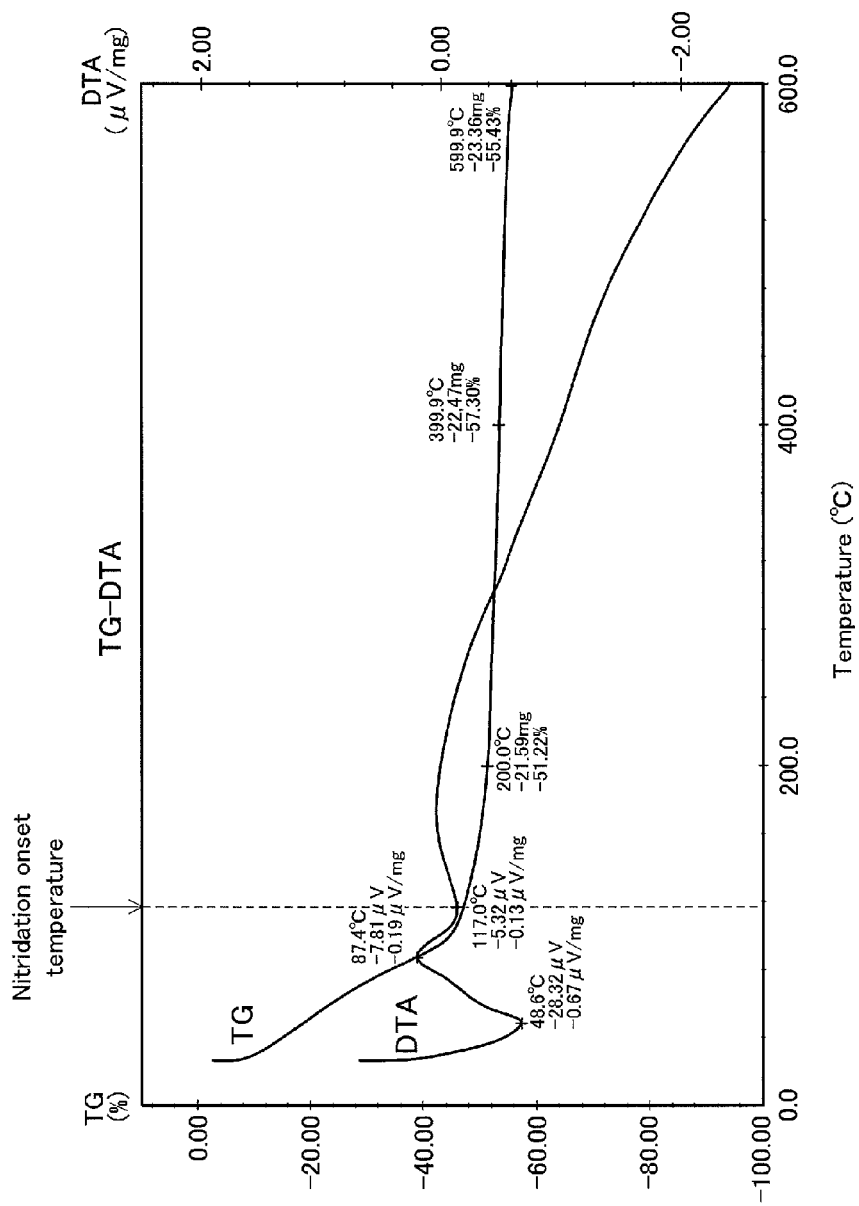
FIG. 2 shows TG-DTA (Thermogravimetry-Differential Thermal Analysis) data of pentakis(dimethylamino)niobium, which is an example of a starting material used in a method for producing a niobium nitride according to a first embodiment of the present invention.

In this reaction, the nitrogen compound gas acts as a nitriding reagent but it also has properties as a reducing agent. Generally, synthesis of a nitride by reaction of an inorganic niobium compound with a nitrogen compound gas requires a temperature of at least 450° C. or higher. However, in the above temperature range, niobium is reduced due to the properties of the nitrogen compound gas as a reducing agent, and NbN (Nb has a valence of +3) is synthesized as a niobium nitride. On the other hand, in the present embodiment, an organic niobium compound which is more reactive with the nitrogen compound gas than an inorganic niobium compound is used as a starting material. Therefore, the nitridation reaction is allowed to occur in a lower temperature range. That is, in the method of the present embodiment, it is possible to set the reaction temperature in the nitriding step to a temperature that is equal to or higher than a nitridation onset temperature of the organic niobium compound used as a starting material and is lower than a reduction onset temperature of Nb. The case where the organic niobium compound used as the starting material contains pentakis(dimethylamino)niobium $Nb(N(CH_3)_2)_5$ is described as an example. FIG. 2 shows TG-DTA data of pentakis(dimethylamino)niobium in an ammonia atmosphere. This data reveals that the temperature required for the onset of the nitridation reaction of pentakis (dimethylamino)niobium is at least 120° C. Preferably, the reaction temperature in the nitriding step is lower than the reduction onset temperature of Nb. Therefore, in the case where pentakis(dimethylamino)niobium is used, it is possible to nitride pentakis(dimethylamino)niobium while preventing reduction of niobium by reacting pentakis(dimethylamino) niobium with a nitrogen compound gas at a temperature in the range of 120° C. or higher and lower than the reduction onset temperature of Nb, and preferably at a temperature in the range of 120° C. or higher and 250° C. or lower. In this way, only the function as a nitriding reagent among the properties of the nitrogen compound gas acts on pentakis(dimethylamino)niobium. As a result, the nitrogen compound gas can nitride the niobium compound without reducing it. Desirably, the linear flow rate of the nitrogen compound gas is, for example, 0.10 m minute$^{-1}$ to 10.0 m minute$^{-1}$. Furthermore, the above-described nitriding step can be repeated, if necessary.

Some of the organic niobium compounds used as starting materials are highly reactive with water and oxygen. For example, the reactivity of pentakis(dimethylamino)niobium with water and oxygen is very high. Therefore, water and oxygen contained in the synthesis system may cause oxidation of the organic niobium compound during the synthesis process. This needs to be avoided during the synthesis of $Nb_3N_5$. Therefore, the concentration of water and oxygen contained in the nitrogen compound gas and in an inert gas used for purging during the synthesis process as needed is desirably 10 ppm by volume or less, and more desirably 1 ppm by volume or less. The inert gas used may be not only a so-called rare gas such as He, Ne, Ar, Kr, or Xe but also nitrogen gas or the like.

Figure 3:
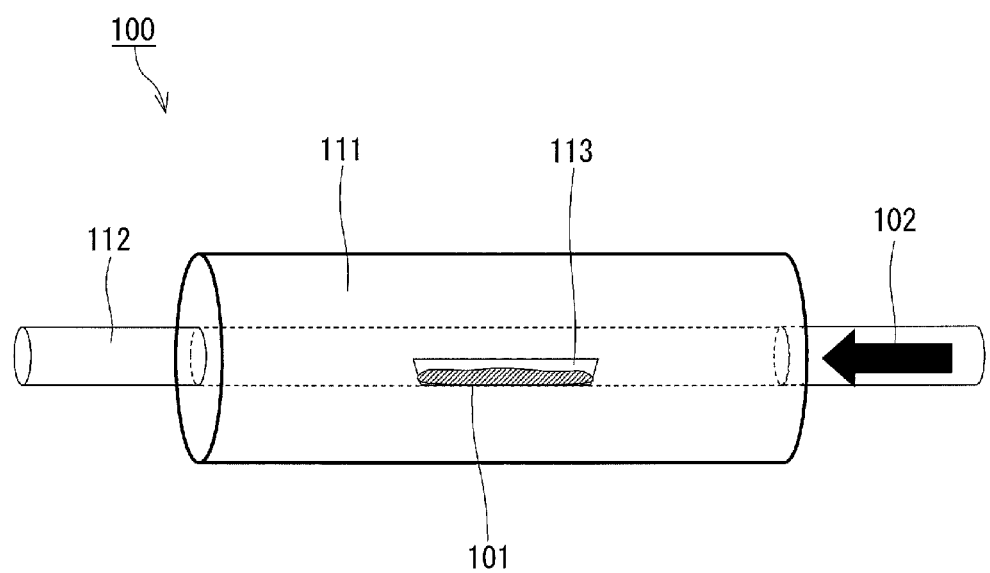
FIG. 3 is a schematic diagram showing an example of an apparatus for carrying out the method for producing a niobium nitride according to the first embodiment of the present invention.

The nitriding step can be carried out using, for example, an apparatus 100 as shown in FIG. 3.

The apparatus 100 includes a tube furnace 111, a tube 112 penetrating the tube furnace 111, and a boat 113 placed in the tube 112. $Nb_3N_5$ ($Nb_3N_5$ powder) can be synthesized by heating a raw material 101 set in the boat 113 in the tube 112, in a gas flow 102 containing a nitrogen compound gas flowing through the tube 112. According to this method, a material in which the main component of a complete nitride is not NbN or the like but $Nb_3N_5$ ($Nb_3N_5$-containing material) can be synthesized.

Any tube and any boat may be used as the tube 112 and the boat 113 in the tube furnace 111 as long as they withstand the temperatures at which they are used and the environments in which they are used. For example, alumina and quartz are suitably used.

The desired niobium nitride, which has a composition represented by the composition formula $Nb_3N_5$ and in which the constituent element Nb has a valence of substantially +5, can be obtained by the method described above.

(Second Embodiment)

Another embodiment of the production method of the niobium nitride $Nb_3N_5$ of the present invention is described below.

The production method of the present embodiment includes the step of heating an organic niobium compound containing a compound represented by the composition formula $R^1N=Nb(NR^2R^3)_3$, where $R^1$, $R^2$ and $R^3$ are each independently a hydrocarbon group, in an atmosphere containing ammonia. This step can be carried out using, for example, the apparatus 100 as shown in FIG. 3, as in the first embodiment. Preferably, the organic niobium compound as the starting material contains $R^1N=Nb(NR^2R^3)_3$, and more preferably it consists of $R^1N=Nb(NR^2R^3)_3$. Here, the case where the organic niobium compound consists of $R^1N=Nb(NR^2R^3)_3$ is described as an example.

In the present embodiment, $Nb_3N_5$ ($Nb_3N_5$ powder) can be synthesized by heating a raw material ($R^1N=Nb(NR^2R^3)_3$) 101 set in the boat 113 in the tube 112, in the gas flow 102 containing ammonia flowing through the tube 112. According to this method, a material in which the main component of a complete nitride is not NbN or the like but $Nb_3N_5$ ($Nb_3N_5$-containing material) can be synthesized.

In the present embodiment, it is preferable that the raw material $R^1N=Nb(NR^2R^3)_3$ be heated at a temperature that is equal to or higher than a nitridation onset temperature of the $R^1N=Nb(NR^2R^3)_3$ and is lower than a reduction onset temperature of Nb. Heating of the raw material in this temperature range makes it possible to synthesize a material in which the main component of a complete nitride is not NbN or the like but $Nb_3N_5$, and thus makes it easier to synthesize a $Nb_3N_5$-containing material ($Nb_3N_5$ powder). Here, the reduction onset temperature of Nb can be determined by TG-DTA measurement or the like. In the $Nb_3N_5$ production method of the present invention, it is possible to synthesize $Nb_3N_5$ even if the temperature for heating the raw material $R^1N=Nb(NR^2R^3)_3$ is higher than the reduction onset temperature of Nb of the $R^1N=Nb(NR^2R^3)_3$. However, in a compound obtained in this case, the content of components other than $Nb_3N_5$, such as NbN, tends to be higher than that in a compound obtained by heating $R^1N=Nb(NR^2R^3)_3$ at a temperature lower than the reduction onset temperature of Nb.

In the $R^1N=Nb(NR^2R^3)_3$ used as the starting material, $R^1$, $R^2$, and $R^3$ are each independently a hydrocarbon group. Therefore, self-condensation reaction is inhibited in the $R^1N=Nb(NR^2R^3)_3$. As $R^1$, a branched-chain hydrocarbon group is suitable because the resulting material is a liquid and thus is easy to handle and easily undergoes a homogeneous reaction, and further the reduction onset temperature of Nb is increased. In particular, a tertiary butyl group ($-C(CH_3)_3$) is suitable. As $R^2$ and $R^3$, straight-chain hydrocarbon groups are suitable because the reduction onset temperature of Nb is increased. Straight-chain alkyl groups ($n\text{-}C_nH_{2n+1}$, where n is an integer of 1 or more) like $-CH_3$ and $C_2H_5$ are suitable. Since a too long carbon chain causes a decrease in the reduction onset temperature of Nb, the carbon number is preferably 3 or less (n<3). Since the raw material in which $R^1$ is a tertiary butyl group ($-C(CH_3)_3$), and $R^2$ and $R^3$ are each independently a straight-chain alkyl group ($n\text{-}C_nH_{2n+1}$, where n is an integer of 1 or more) has high heat resistance, it can be synthesized at higher temperatures. As a result, highly crystalline $Nb_3N_5$ having much better optical semiconductor properties can be synthesized more easily. It should be noted, however, that the starting material used in the present embodiment is highly reactive with oxygen and water.

Therefore, the content of oxygen and water in the starting material is desirably 1 mol ppm or less of the total amount of the starting material, and more desirably 0.1 mol ppm or less.

The inert gas used may be not only a so-called rare gas such as He, Ne, Ar, Kr, or Xe but also nitrogen gas or the like. It is desirable to use a gas having a low content of oxygen and water. Therefore, the content of oxygen and water in the inert gas is desirably 10 ppm by volume or less, and more desirably 1 ppm by volume or less.

Figure 4:
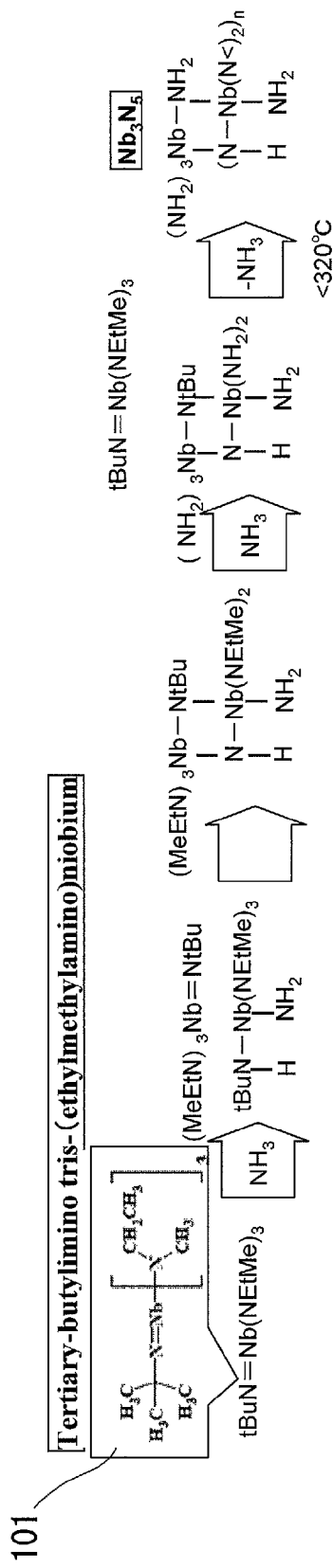
FIG. 4 is a diagram illustrating a $Nb_3N_5$ synthesis mechanism in a method for producing $Nb_3N_5$ according to a second embodiment of the present invention.

Next, the $Nb_3N_5$ synthesis mechanism in the production method of the present embodiment is described with reference to FIG. 4. Here, the case where tertiary-butylimino tris-(ethylmethylamino)niobium (tBuN=Nb(NEtMe)$_3$), where $R^1$ is a tertiary butyl group, $R^2$ is an ethyl group, and $R^3$ is a methyl group, is used as a raw material 101 is described as an example. A compound produced by adding ammonia ($NH_3$) to this raw material ($R^1N$=Nb($NR^2R^3$)$_3$) 101 acts as an initiator and causes addition polymerization of $R^1N$=Nb($NR^2R^3$)$_3$. Next, $NR^2R^3$ reacts with ammonia and then is condensation polymerized. Thus, a $Nb_3N_5$ powder is obtained. Since the production method of the present embodiment has such a reaction scheme, much less NbN is produced compared to complete nitridation of $Nb_2O_5$ with ammonia.

The production method of the present embodiment makes it possible to synthesize not NbN but $Nb_3N_5$ as a complete nitride of Nb. As a result, $Nb_3N_5$ having better optical semiconductor properties for generation of hydrogen and oxygen by decomposition of water than conventional semiconductor materials ($Nb_3N_5$ having a smaller band gap and better sunlight utilization efficiency than conventional semiconductor materials) can be produced easily and inexpensively.

(Third Embodiment)

An embodiment of the production method of the niobium nitride ($Nb_3N_5$)-containing film of the present invention is described below.

Figure 5:
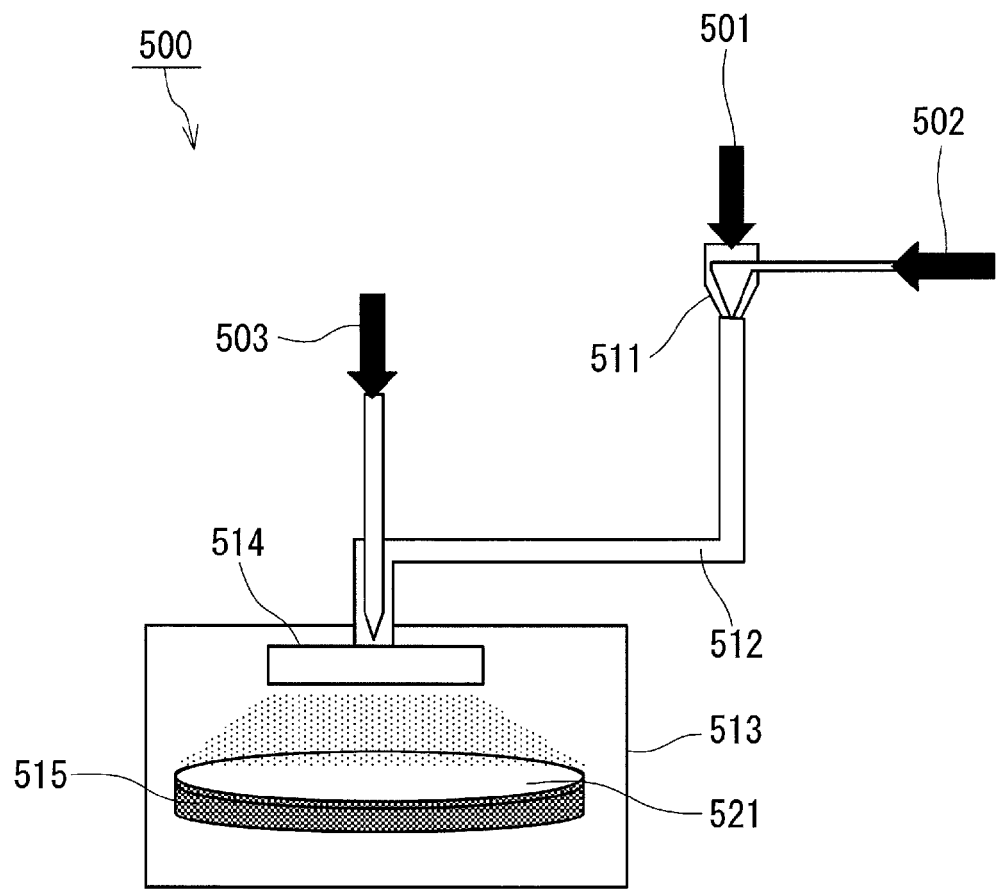
FIG. 5 is a schematic diagram showing an example of an apparatus for carrying out a method for producing a niobium nitride-containing film according to a third embodiment of the present invention.

The production method of the present embodiment includes the steps of (I) vaporizing an organic niobium compound (for example Nb($NR^2$)$_5$, where R is an alkyl group having 1 to 3 carbon atoms (preferably 1 to 2 carbon atoms); and (II) bringing the vaporized organic niobium compound and a nitrogen compound gas into contact with a heated substrate. These steps can be carried out using, for example, a MOCVD (Metal-Organic Chemical Vapor Deposition) apparatus 500 as shown in FIG. 5. This method makes it possible to produce a $Nb_3N_5$-containing film while suppressing the generation of NbN. In addition, this method makes it possible to produce a $Nb_3N_5$-containing film fixed to a substrate by chemical bonding. The $Nb_3N_5$-containing film obtained by the method of the present embodiment allows $Nb_3N_5$ to exhibit its excellent optical semiconductor properties because the $Nb_3N_5$-containing film is well fixed to the substrate.

The reaction mechanism between the organic niobium compound and the nitrogen compound gas and the suitable reaction temperature in the above step (II) are the same as in the first embodiment. The compound suitably used as the organic niobium compound and the gas suitably used as the nitrogen compound gas are also the same as in the first embodiment. The MOCVD apparatus 500 includes a vaporizer 511, an inlet pipe 512, a reaction chamber 513, a shower head 514, and a susceptor 515. The vaporizer 511 vaporizes the raw material. The reaction chamber 513 serves as a chamber into which a source gas obtained by vaporizing the raw material in the vaporizer 511 is supplied to grow a crystal on the treatment surface of a substrate 521. The inlet pipe 512 supplies a gas such as a source gas to the reaction chamber 513 from the vaporizer 511. The shower head 514 is connected to the end of the inlet pipe 512. It is placed inside the reaction chamber 513 and injects a source gas, a reactant gas, etc. to the substrate 521 to grow a crystal thereon. The susceptor 515 supports the substrate 521 on which the crystal is to be grown and heats the substrate 521.

In the MOCVD apparatus 500, a reactant gas 503 containing ammonia is mixed into an inert gas 502 containing the raw material 501 heated (desirably heated at a temperature lower than the reduction onset temperature of Nb) and vaporized in the vaporizer 511. The mixed gas is injected from the shower head 514 to the substrate 521 heated by the susceptor 515. The temperature of the heated substrate 521 is preferably in the range of temperatures that are equal to or higher than the nitridation onset temperature of the raw material 501 and lower than the reduction onset temperature of Nb. Thus, $Nb_3N_5$ can be deposited in the crystalline form on the substrate 521 so as to form a $Nb_3N_5$-containing film. The inert gas 502 used here may be not only a so-called rare gas such as He, Ne, Ar, Kr, or Xe but also nitrogen gas or the like. It is desirable to use a gas having a low content of oxygen and water. Therefore, the content of oxygen and water in the inert gas is desirably 10 ppm by volume or less, and more desirably 1 ppm by volume or less.

It is desirable that the pipe wall of the MOCVD apparatus 500 be made of stainless steel because water and oxygen are less likely to be adsorbed on or desorbed from stainless steel. In order to prevent the attachment of the raw material onto the pipe wall, a solution of the raw material and an organic solvent may be vaporized. In this case, a nonaqueous solvent capable of dissolving the raw material and having the vaporization properties similar to those of the raw material, such as hydrocarbon, is suitable as the organic solvent. For example, ethylcyclohexane is suitably used.

According to the production method of the present embodiment, a $Nb_3N_5$-containing film having a very low content of NbN can be produced easily and inexpensively. As a result, a $Nb_3N_5$-containing film having better optical semiconductor properties for generation of hydrogen and oxygen by decomposition of water than films made of conventional semiconductor materials (a $Nb_3N_5$-containing film having a smaller band gap and better sunlight utilization efficiency than conventional semiconductor materials) can be produced easily and inexpensively.

(Fourth Embodiment)

Another embodiment of the production method of the niobium nitride ($Nb_3N_5$)-containing film of the present invention is described below.

In the present embodiment, the method for producing a $Nb_3N_5$-containing film in the case where the organic niobium compound contains a compound represented by the composition formula $R^1N$=Nb($NR^2R^3$)$_3$, where $R^1$, $R^2$ and $R^3$ are each independently a hydrocarbon group and the nitrogen compound gas contains ammonia, in the production method of the third embodiment, is described. Here, in particular, the case where the organic niobium compound consists of $R^1N$=Nb($NR^2R^3$)$_3$ is described. That is, the production method of the present embodiment includes the steps of: (I) vaporizing $R^1N$=Nb($NR^2R^3$)$_3$, where $R^1$, $R^2$, and $R^3$ are each independently a hydrocarbon group); and (II) bringing the vaporized $R^1N$=Nb($NR^2R^3$)$_3$ and ammonia into contact with a heated substrate. These steps can be carried out using, for example, the MOCVD apparatus 500 as shown in FIG. 5 described in the third embodiment. This method makes it possible to produce a $Nb_3N_5$-containing film while suppressing the generation of NbN. In addition, this method makes it possible to produce a $Nb_3N_5$-containing film fixed to a substrate by chemical bonding. The $Nb_3N_5$-containing film obtained by the method of the present embodiment allows $Nb_3N_5$ to exhibit its excellent optical semiconductor properties because the $Nb_3N_5$-containing film is well fixed to the substrate.

It is preferable that, in the step (II), the substrate be heated to a temperature that is equal to or higher than the nitridation onset temperature of $R^1N\!\!=\!\!Nb(NR^2R^3)_3$ as a raw material and is lower than the reduction onset temperature of Nb. Heating of the substrate in this range of temperatures makes it possible to synthesize not NbN but $Nb_3N_5$ as a complete nitride of Nb. It is preferable that, in the step (I), the raw material be vaporized at a temperature that is lower than the reduction onset temperature of Nb of this raw material.

$R^1N\!\!=\!\!Nb(NR^2R^3)_3$ used as the starting material is the same as that described in the second embodiment. Therefore, detailed description thereof is omitted here.

The configuration of the MOCVD apparatus 500 is as described in the third embodiment. In this MOCVD apparatus 500, the reactant gas 503 containing ammonia is mixed into the inert gas 502 containing the raw material ($R^1N\!\!=\!\!Nb(NR^2R^3)_3$) 501 heated (desirably heated at a temperature lower than the reduction onset temperature of Nb) and vaporized in the vaporizer 511. The mixed gas is injected from the shower head 514 to the substrate 521 heated by the susceptor 515. At this time, preferably, the substrate 521 is heated to a temperature that is equal to or higher than the nitridation onset temperature of the raw material 501 and is lower than the reduction onset temperature of Nb, as described above. Thus, $Nb_3N_5$ can be deposited on the substrate 521 so as to form a $Nb_3N_5$-containing film. The specific examples of the inert gas 502 used herein are the same as those of the inert gas used in the second embodiment.

It is desirable that the pipe wall of the MOCVD apparatus 500 be made of stainless steel because water and oxygen are less likely to be adsorbed on or desorbed from stainless steel. In order to prevent the attachment of $R^1N\!\!=\!\!Nb(NR^2R^3)_3$ on the pipe wall, a solution of the $R^1N\!\!=\!\!Nb(NR^2R^3)_3$ and an organic solvent may be vaporized. In this case, a nonaqueous solvent capable of dissolving $R^1N\!\!=\!\!Nb(NR^2R^3)_3$ and having the vaporization properties similar to those of $R^1N\!\!=\!\!Nb(NR^2R^3)_3$, such as hydrocarbon, is suitable as the organic solvent. For example, ethylcyclohexane is suitably used.

Figure 6:
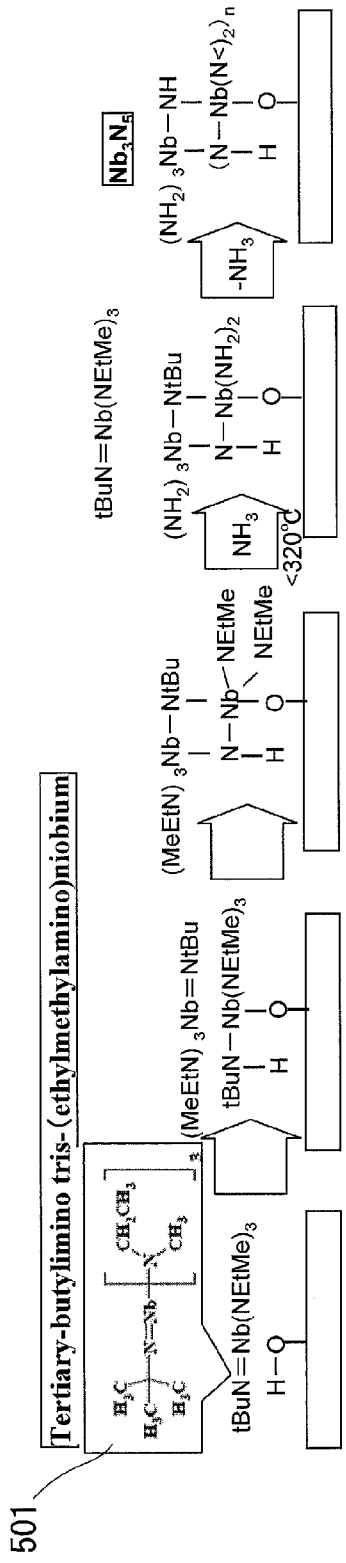
FIG. 6 is a diagram illustrating a $Nb_3N_5$-containing film synthesis mechanism in a method for producing a $Nb_3N_5$-containing film according to a fourth embodiment of the present invention.

Next, the synthesis mechanism of the $Nb_3N_5$-containing film in the production method of the present embodiment is described with reference to FIG. 6. Here, the case where tertiary-butylimino tris-(ethylmethylamino)niobium ($tBuN\!\!=\!\!Nb(NEtMe)_3$), where $R^1$ is a tertiary butyl group, $R^2$ is an ethyl group, and $R^3$ is a methyl group, is used as the raw material 501 is described as an example. A compound produced by adding this raw material ($R^1N\!\!=\!\!Nb(NR^2R^3)_3$) 501 to hydroxyl groups on the surface of the substrate 521 acts as an initiator and causes addition polymerization of $R^1N\!\!=\!\!Nb(NR^2R^3)_3$. Next, $NR^2R^3$ reacts with ammonia and then is condensation polymerized. Thus, a $Nb_3N_5$-containing film is obtained. Since the production method of the present embodiment has such a reaction scheme, much less NbN is produced compared to complete nitridation of $Nb_2O_5$ with ammonia.

According to the production method of the present embodiment, a $Nb_3N_5$-containing film having a very low content of NbN can be produced. As a result, a $Nb_3N_5$-containing film having better optical semiconductor properties for generation of hydrogen and oxygen by decomposition of water than films made of conventional semiconductor materials (a $Nb_3N_5$-containing film having a smaller band gap and better sunlight utilization efficiency than conventional semiconductor materials) can be produced easily and inexpensively.

(Fifth Embodiment)

In the fifth embodiment, an embodiment of the niobium nitride $Nb_3N_5$ of the present invention as a photocatalyst is described.

The photocatalyst of the present embodiment consists of the niobium nitride $Nb_3N_5$ described in the first embodiment. The niobium nitride $Nb_3N_5$ described in the first and second embodiments is a semiconductor having a band gap and can be used as a photocatalyst. Hereinafter, the reason for this is described.

Figure 7:
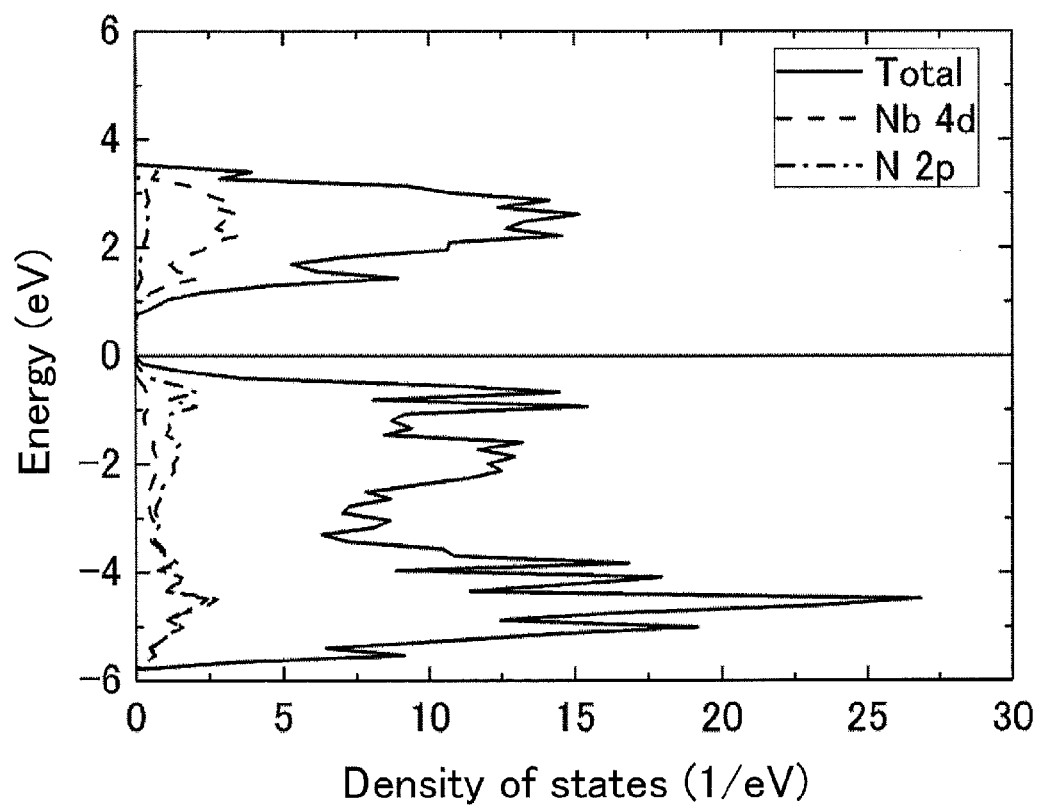
FIG. 7 is a diagram of the density of states distribution of $Nb_3N_5$.

FIG. 7 shows density of states distribution of $Nb_3N_5$ obtained by the first-principles band calculation. It can be seen from this figure that $Nb_3N_5$ is a semiconductor having a band structure in which the valence band mainly consists of nitrogen 2p orbitals, the conduction band mainly consists of niobium 4d orbitals, and a band gap exists between these two bands. The measured value of the band gap width is 1.6 eV as described later in Example 1-1. This value is equivalent to the energy of light having a wavelength of 780 nm. That is, when $Nb_3N_5$ is irradiated with light having a wavelength of 780 nm or less, electrons in the valence band absorb the light and are excited into the conduction band. Here, when a reactive substrate is present in the vicinity of the surface of $Nb_3N_5$ and the oxidation-reduction potential of the reactive substrate is located at a potential on the positive side of the bottom of the conduction band of $Nb_3N_5$, the excited electrons move from $Nb_3N_5$ to the reactive substrate and the reduction reaction of the reactive substrate can proceed. Examples of the reactive substrate having such an oxidation-reduction potential include water, proton, oxygen, metal ions such as silver (I) ion and iron (III) ion, and iodide ion. On the other hand, holes are generated in the valence band with the photoexcitation of electrons. Here, when a reactive substrate is present in the vicinity of the surface of $Nb_3N_5$ and the oxidation-reduction potential thereof is located at a potential on the negative side of the top of the valence band of $Nb_3N_5$, holes move from $Nb_3N_5$ to the reactive substrate and the oxidation reaction of the reactive substrate can proceed. Examples of the reactive substrate having such an oxidation-reduction potential include water, hydroxide ion, metal ions such as iron (II) ion, iodine ion, and an organic compound. Such a phenomenon shows that $Nb_3N_5$ acts as a photocatalyst.

(Sixth Embodiment)

As described in the fifth embodiment, the niobium nitride $Nb_3N_5$ of the present invention can absorb visible light and has band edges at levels between which the oxidation-reduction potential of water is present. In addition, the niobium nitride of the present invention has high stability in an aqueous solution under light irradiation. Therefore, the use of the niobium nitride of the present invention as a photocatalyst makes it possible to obtain a hydrogen generation device in which hydrogen is generated through decomposition of water. Since such a hydrogen generation device using the niobium nitride $Nb_3N_5$ as a photocatalyst is very efficient in utilizing sunlight, hydrogen can be generated more efficiently than conventional devices.

The hydrogen generation device of the present embodiment includes: a photocatalyst consisting of a semiconductor containing a niobium nitride $Nb_3N_5$; an aqueous solution containing an electrolyte and being in contact with the photocatalyst; and a container containing the photocatalyt and the aqueous solution. When the photocatalyst is irradiated with light, water in the aqueous solution is decomposed and hydrogen is generated.

The configuration of the hydrogen generation device of the present embodiment is, for example, a configuration in which a photocatalyst consisting of a semiconductor (optical semiconductor) containing the niobium nitride $Nb_3N_5$ is suspended or immersed in an aqueous solution containing an electrolyte and the resulting solution is placed in a container. When this device is irradiated with light, water is decomposed by the photocatalyst, and thus hydrogen can be generated more efficiently than in the use of conventional photocatalysts.

Figure 8:
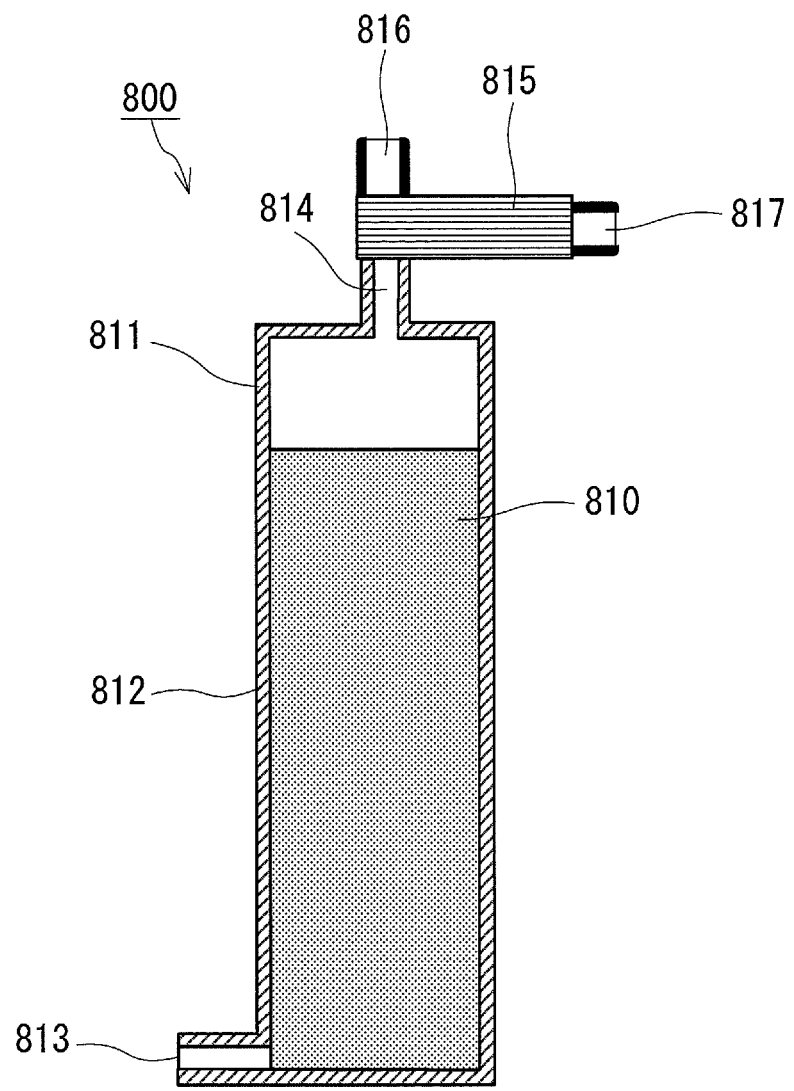
FIG. 8 is a schematic diagram showing an example of a hydrogen generation device according to a sixth embodiment of the present invention.

An example of the hydrogen generation device of the present invention is described below with reference to FIG. 8. A hydrogen generation device 800 of the present embodiment includes an aqueous solution containing an electrolyte (electrolytic solution) 810, in which a photocatalyst consisting of a semiconductor (optical semiconductor) containing the niobium nitride $Nb_3N_5$ described in the first and second embodiments is suspended, and a container 811 containing the electrolytic solution 810. This hydrogen generation device 800 decomposes water by irradiating the electrolytic solution 810 with light so as to generate hydrogen.

At least a portion (herein referred to as a light incident portion 812) of the container 811 is made of a material that transmits light such as sunlight so as to allow light such as sunlight to reach the inside of the container 811. The container 811 is further provided with an outlet 814 for discharging hydrogen and oxygen generated in the container 811 and an inlet 813 for supplying water to be decomposed into the container 811. The hydrogen generation device 800 further includes a hydrogen separation membrane 815, an oxygen outlet 816, and a hydrogen outlet 817. The hydrogen separation membrane 815 separates hydrogen from the gas discharged from the outlet 814. The hydrogen thus separated is discharged from the hydrogen outlet 817. After the hydrogen is separated, the remaining oxygen is discharged from the oxygen outlet 816.

Next, the operation of the hydrogen generation device 800 of the present embodiment is described with reference to FIG. 8.

The electrolytic solution 810 placed in the container 811 and containing the photocatalyst suspended therein is irradiated with sunlight through the light incident portion 812 of the container 811 in the hydrogen generation device 800. In this case, electrons are generated in the conduction band of the $Nb_3N_5$-containing material in the electrolytic solution 810 and holes are generated in the valence band thereof. The holes thus generated decompose water and causes oxygen to be generated according to the reaction formula (1) below. On the other hand, the electrons causes hydrogen to be generated according to the reaction formula (2) below.

$$4h^+ + 2H_2O \rightarrow O_2\uparrow 4H^+ \quad (1)$$

$$4e^- + 4H^+ \rightarrow 2H_2\uparrow \quad (2)$$

The oxygen and hydrogen thus generated are discharged from the outlet 814 and separated through the hydrogen separation membrane 815, and then oxygen is discharged from the oxygen outlet 816 and hydrogen is discharged from the hydrogen outlet 817, respectively. Water is supplied into the container 811 through the inlet 813 to replenish the water used for decomposition.

Since the photocatalyst used in the present embodiment has excellent optical semiconductor properties, the probability of recombination of holes and electrons is low. Therefore, in the hydrogen generation device 800, the quantum efficiency of the hydrogen evolution reaction by light irradiation can be increased. In addition, since the photocatalyst used in the present embodiment has a small band gap, it is also responsive to visible light. As a result, the hydrogen generation device 800 of the present embodiment can generate more hydrogen than devices using conventional optical semiconductor materials.

Other configuration examples of the hydrogen generation device of the present embodiment are described with reference to FIG. 9 and FIG. 10.

Figure 9:
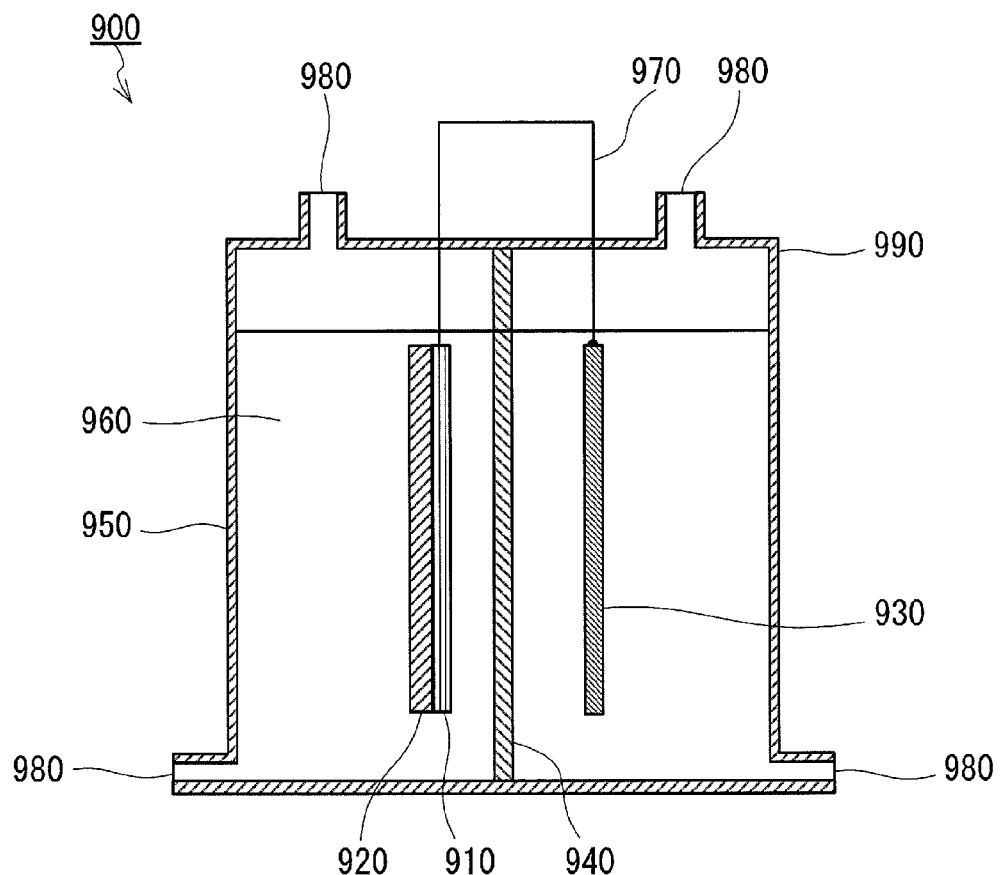
FIG. 9 is a schematic cross-sectional diagram showing another example of the hydrogen generation device according to the sixth embodiment of the present invention.

A hydrogen generation device 900 of FIG. 9 includes a container 990, a photocatalyst electrode 920, a conductive substrate 910, and a counter electrode 930. The photocatalyst electrode 920 includes the $Nb_3N_5$-containing film described in the third and fourth embodiments. The container 990 has, in its upper part, two openings 980 for collecting hydrogen and oxygen respectively. The container 990 has, in its lower part, two openings 980 serving as water inlets. An aqueous solution containing an electrolyte (electrolytic solution) 960 is placed in the container 990. The container 990 has a separator 940 between the photocatalyst electrode 920 and the counter electrode 930 to separate a hydrogen generation chamber from an oxygen generation chamber. The separator 940 has a function of transmitting ions and separating a gas generated on the photocatalyst electrode 920 side from a gas generated on the counter electrode 930 side. A portion (a light incident portion 950) of the container 990 that faces the surface of the photocatalyst electrode 920 disposed inside the container 990 is made of a material that transmits light such as sunlight. The conductive substrate 910 and the counter electrode 930 are electrically connected by a conducting wire 970. As used herein, the counter electrode refers to an electrode that can exchange electrons with the photocatalyst electrode without the electrolytic solution. Accordingly, in the present embodiment, there is no particular limitation on the positional relationship, etc. of the counter electrode 930 with the photocatalyst electrode 920 and the conductive substrate 910, as long as the counter electrode 930 is connected electrically to the conductive substrate 910 that supports the photocatalyst electrode 920. It should be noted that since the $Nb_3N_5$-containing film used in the present embodiment is an n-type semiconductor, the counter electrode 930 serves as an electrode that receives electrons from the photocatalyst electrode 920 without the electrolytic solution 960.

Since the photocatalyst electrode 920 is a semiconductor having a band gap, it usually has a lower conductivity than metals. In addition, recombination of electrons and holes needs to be prevented as much as possible. Therefore, it is preferable to reduce the thickness of the photocatalyst electrode 920. Thus, here, the photocatalyst electrode 920 is formed as a thin film (with a thickness of about 50 to 500 nm) on the conductive substrate 910. Furthermore, it is preferable to increase the surface area of the photocatalyst electrode 920 to increase the light absorption efficiency.

It is preferable that the portion of the conductive substrate 910 that is not covered with the photocatalyst electrode 920 be covered, for example, with an insulating material such as resin. This covering prevents the conductive substrate 910 from being dissolved in the electrolytic solution 960.

It is preferable to use a material with a low overvoltage for the counter electrode 930. For example, it is preferable to use a metal catalyst such as Pt, Au, Ag, Fe, or Ni as the counter electrode 930 because the use thereof increases its activity. Any electrolytic solution can be used for the electrolytic solution 960 as long as it is a solution containing water. An acidic, neutral or basic solution can be used.

Figure 10:
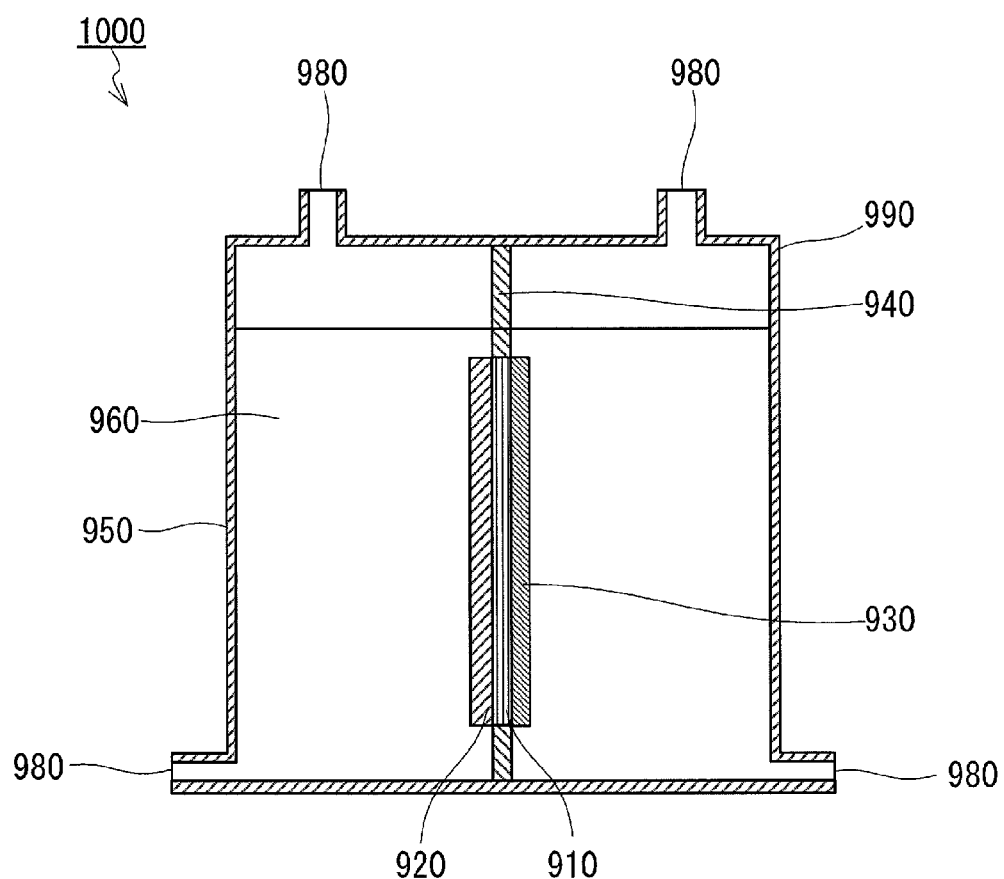
FIG. 10 is a schematic cross-sectional diagram showing still another example of the hydrogen generation device according to the sixth embodiment of the present invention.

Another hydrogen generation device 1000 shown in FIG. 10 also includes the container 990, the photocatalyst electrode 920, the conductive substrate 910, and the counter electrode 930 (in FIG. 10, the same or similar members are designated by the same reference numerals as in FIG. 9). The container 990 has four openings 980 and contains the electrolytic solution 960. The photocatalyst electrode 920 is provided on one surface of the conductive substrate 910 and the counter electrode 930 is provided on the other surface thereof. The photocatalyst electrode 920 is formed as a thin film (with a thickness of about 50 to 500 nm). The photocatalyst electrode 920 and the counter electrode 930 are electrically connected by the conductive substrate 910. The inside of the container 990 is separated into a photocatalyst electrode 920 side and a counter electrode 930 side by the separator 940 and the conductive substrate 910 to separate a hydrogen generation chamber from an oxygen generation chamber. A portion (a light incident portion 950) of the container 990 that faces the surface of the photocatalyst electrode 920 disposed inside the container 990 is made of a material that transmits light such as sunlight.

Hydrogen and oxygen can be generated by irradiating the hydrogen generation devices shown in FIG. 9 and FIG. 10 with light (for example, sunlight) through the light incident portion 950. In particular, in these hydrogen generation devices, longer wavelength light can be absorbed and thus hydrogen can be generated more efficiently.

The operation of the hydrogen generation device 900 of the present embodiment is described in more detail. When the photocatalyst electrode 920 disposed in the container 990 is irradiated with sunlight through the light incident portion 950 of the container 990 in the hydrogen generation device 900, electrons are generated in the conduction band and holes are generated in the valence band, respectively, in the portion of the photocatalyst electrode 920 irradiated with light.

Since the $Nb_3N_5$-containing film that constitutes the photocatalyst electrode 920 is an n-type semiconductor, the potential of the surface of the photocatalyst electrode 920 is higher than the potential of the inside thereof. Therefore, the holes generated at this time move to the surface of the photocatalyst electrode 920 along the band edge of the valence band. Thus, water is decomposed on the surface of the photocatalyst electrode 920 according to the above reaction formula (1), so that oxygen is generated. On the other hand, the electrons move, along the band edge of the conduction band, from the surface near-field region of the photocatalyst electrode 920 to the conductive substrate 910 through the inside of the photocatalyst electrode 920. When the electrons reach the conductive substrate 910, they are transferred, through the conducting wire 970, to the side of the counter electrode 930 connected electrically to the conductive substrate 910. Thus, hydrogen is generated on the surface of the counter electrode 930 according to the above reaction formula (2).

The oxygen thus generated is discharged from the opening 980 for collecting oxygen on the photocatalyst electrode 920 side, and the hydrogen thus generated is discharged from the opening 980 for collecting hydrogen on the counter electrode 930 side, respectively. Water is supplied into the container 990 through the opening 980 serving as a water inlet to replenish the water used for decomposition.

Since the $Nb_3N_5$-containing film provided for the photocatalyst electrode 920 used in the present embodiment has excellent optical semiconductor properties, the probability of recombination of holes and electrons is low. Furthermore, the hydrogen generation devices 900 and 1000 of the present embodiment are each a so-called photoelectrochemical cell using, as an electrode, a $Nb_3N_5$-containing film serving as an optical semiconductor. Therefore, in the hydrogen generation devices 900 and 1000, efficient charge separation between holes and electrons is achieved, and thus the quantum efficiency of the hydrogen evolution reaction by light irradiation is increased. In addition, since $Nb_3N_5$ has a small band gap, it is also responsive to visible light in sunlight. As a result, the hydrogen generation devices 900 and 1000 of the present embodiment can generate more hydrogen than devices using conventional optical semiconductor materials. Moreover, in the hydrogen generation devices 900 and 1000, hydrogen and oxygen can be generated separately, and thus it is easy to collect hydrogen and oxygen separately.

(Seventh Embodiment)

An embodiment of the energy system of the present invention is described. The energy system of the present embodiment is a system that uses the photocatalyst described in the fifth embodiment. The energy system of the present embodiment is a system in which hydrogen generated through decomposition of water by irradiation of the photocatalyst with light is supplied to a fuel cell and converted into electrical energy.

Figure 11:
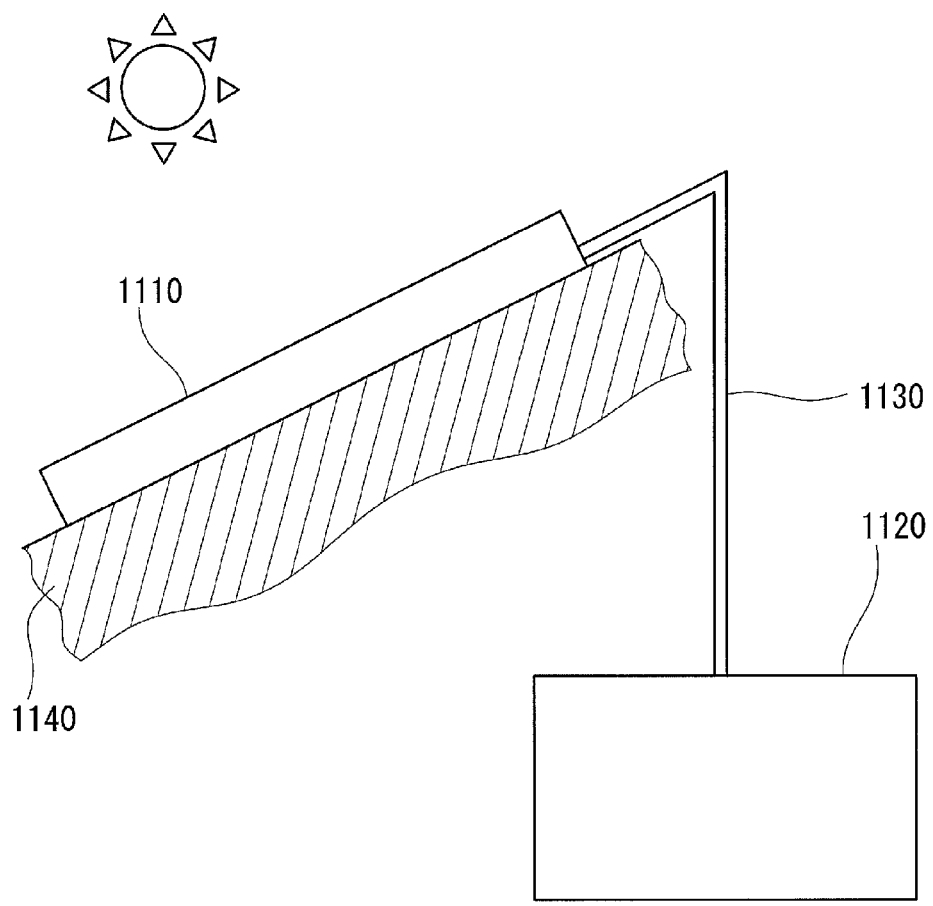
FIG. 11 is a schematic diagram showing an example of an energy system according to a seventh embodiment of the present invention.

The energy system of the present embodiment includes such a hydrogen generation device as described in the sixth embodiment. FIG. 11 shows a schematic view of the energy system of the present embodiment that uses sunlight. The energy system of the present invention is not limited to the configuration shown in FIG. 11.

The energy system of the present embodiment includes such a hydrogen generation device 1110 as described in the sixth embodiment, a fuel cell 1120, and a line 1130 for supplying the hydrogen generated in the hydrogen generation device 1110 to the fuel cell 1120.

The hydrogen generation device 1110 is installed in a place 1140 filled with sunlight such as on the roof, for example. When the hydrogen generation device 1110 is installed, it is desirable to orient the surface of the hydrogen generation device 1110 on which the photocatalyst is provided to face the sun so that the hydrogen generation device 1110 can efficiently receive sunlight. The hydrogen obtained in the hydrogen generation device 1110 through decomposition of water caused by the photocatalytic reaction is discharged out of the hydrogen generation device 1110 through the line 1130 so as to be supplied to the fuel cell 1120.

The line 1130 may be provided, for example, with a hydrogen storage unit for storing hydrogen, a dehumidifier for removing moisture in the hydrogen, a compressor unit when hydrogen is required to be compressed for storage, etc.

Figure 12:
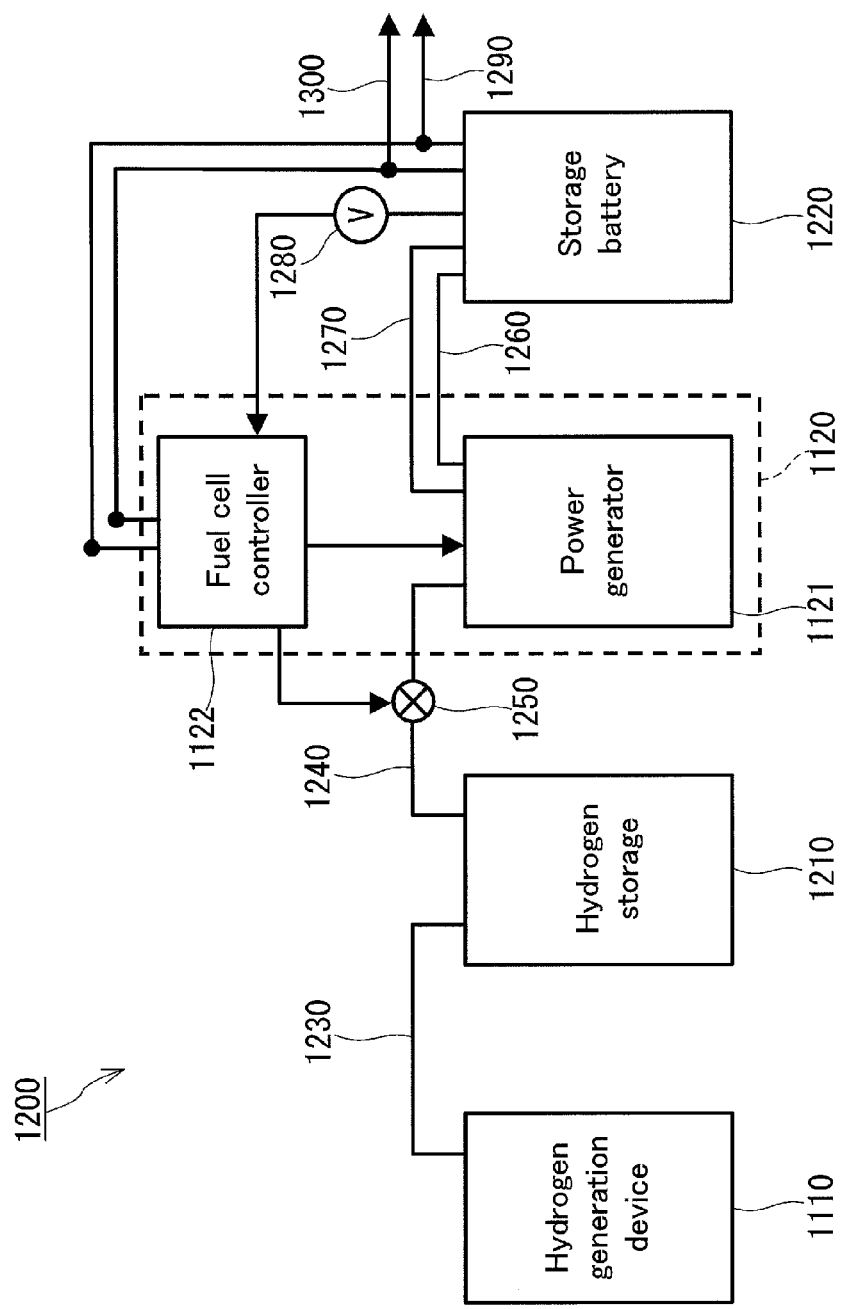
FIG. 12 is a schematic diagram showing a more specific example of the energy system according to the seventh embodiment of the present invention.

FIG. 12 shows a more specific example of the energy system of the present embodiment. An energy system 1200 shown in FIG. 12 includes a hydrogen generation device 1110, a hydrogen storage 1210, a fuel cell 1120, and a storage battery 1220.

The hydrogen storage 1210 is connected to the hydrogen generation device 1110 by a first pipe 1230 and stores hydrogen generated in the hydrogen generation device 1110. The hydrogen storage 1210 can be composed of, for example, a compressor for compressing hydrogen generated in the hydrogen generation device 1110 and a high-pressure hydrogen tank for storing the hydrogen compressed by the compressor.

The fuel cell 1120 includes a power generator 1121 and a fuel cell controller 1122 for controlling the power generator 1121. The fuel cell 1120 is connected to the hydrogen storage 1210 by a second pipe 1240, and converts the hydrogen stored in the hydrogen storage 1210 into electricity and heat. The second pipe 1240 is provided with a block valve 1250. For example, a polymer electrolyte fuel cell can be used as the fuel cell 1120.

The positive electrode and the negative electrode of the storage battery 1220 respectively are connected electrically to the positive electrode and the negative electrode of the power generator 1121 in the fuel cell 1120 by a first line 1260 and a second line 1270. The storage battery 1220 is provided with a capacity meter 1280 for measuring the remaining capacity of the storage battery 1220. For example, a lithium ion battery can be used as the storage battery 1220.

Next, the operation of the energy system 1200 is described.

The hydrogen generated by the operation of the hydrogen generation device described in the sixth embodiment is supplied into the hydrogen storage 1210 through the opening 980 for collecting hydrogen (see FIG. 9 and FIG. 10) and the first pipe 1230.

In generating power in the fuel cell 1120, the block valve 1250 is opened according to signals from the fuel cell controller 1122, so that the hydrogen stored in the hydrogen storage 1210 is supplied to the power generator 1121 of the fuel cell 1120 through the second pipe 1240.

The electricity generated in the power generator 1121 of the fuel cell 1120 is stored in the storage battery 1220 through the first line 1260 and the second line 1270. The electricity stored in the storage battery 1220 is supplied to home and business users through a third line 1290 and a fourth line 1300.

In the hydrogen generation device 1110, the quantum efficiency of the hydrogen evolution reaction by light irradiation can be increased. Thus, the energy system 1200 including this hydrogen generation device 1100 can supply electric power efficiently.

EXAMPLES

Hereinafter, the present invention is described further in detail with reference to examples. The following examples are merely exemplary and are not intended to limit the present invention.

Example 1

In Example 1, an example in which a compound represented by the composition formula $Nb(NR^2)_5$ was used as an organic niobium compound that is a starting material is described.

Example 1-1

Example 1-1 of the present invention is specifically described. As a starting material, pentakis(dimethylamino) niobium ($Nb(N(CH_3)_2)_5$) powder (1.0 g) was used. The starting material was maintained at room temperature for 8 hours under a flow of ammonia gas (with a purity of 99.999% or more) at a linear flow rate of 2.2 m minute$^{-1}$. Subsequently, the temperature of the starting material was raised to 160° C. at a temperature rise rate of 5° C. minute$^{-1}$ under the ammonia gas flow at a linear flow rate of 2.2 m minute$^{-1}$, and then maintained at 160° C. for 8 hours. Then, the temperature of the material was lowered to room temperature at a temperature drop rate of 5° C. minute$^{-1}$. Thus, $Nb_3N_5$ was obtained. The elemental composition of the synthesized $Nb_3N_5$ was analyzed. As a result, the composition ratio (molar ratio) thereof was Nb/N=3.0/4.9, which was almost equal to the theoretical composition ratio of $Nb_3N_5$, i.e., Nb/N=3.0/5.0. From this analysis result, production of $Nb_3N_5$ powder was confirmed.

Figure 13:
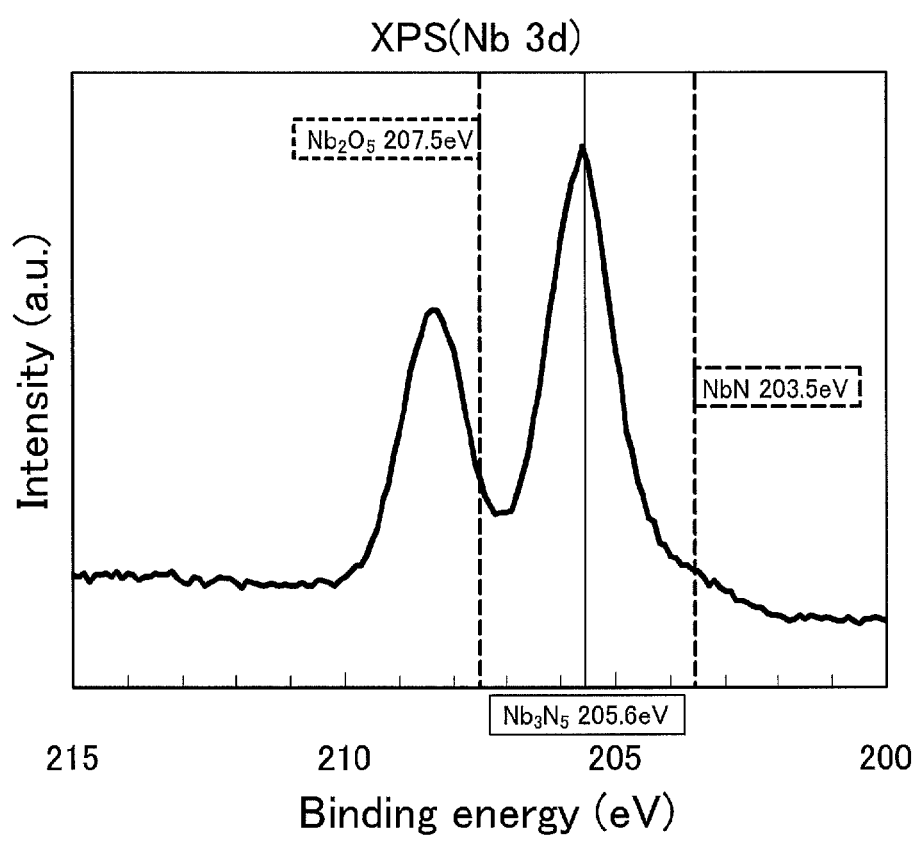
FIG. 13 shows an X-ray photoelectron spectrum of $Nb_3N_5$ according to Example 1-1 of the present invention.

FIG. 13 shows the X-ray photoelectron spectrum of the $Nb_3N_5$ powder synthesized in this example. The X-ray photoelectron spectrum is obtained by observing the kinetic energy of photoelectrons emitted from a sample under X-ray irradiation. In the spectrum of the sample, the peak position of the sample shifts due to a difference in the chemical state of a target element. Therefore, information about the valence and binding state of the element can be obtained from the shift. Generally speaking, the higher the valence of the element is, the more the peak position in the spectrum shifts toward the high binding energy side. Furthermore, the higher the electronegativity of an element bonded to the target element is, the more the peak position shifts toward the high binding energy side. In the spectrum of FIG. 13, the Nb 3d5/2 peak is located at a binding energy of 205.6 eV. This means that the Nb 3d5/2 peak is located between the peak of $Nb_2O_5$ (where niobium has a valence of +5) as a reference and the peak of NbN (where niobium has a valence of +3). The Nb element of $Nb_3N_5$ is bonded to the N element, while the Nb element of $Nb_2O_5$ is bonded to the O element. Presumably, since the O element is more electronegative than the N element, the peak of $Nb_2O_5$ shifts more toward the high binding energy side than that of $Nb_3N_5$, as described above. In view of the above, the above peak position of $Nb_3N_5$ in the spectrum means that Nb species contained in the sample has a valence of +5 and it is bonded to N.

Figure 14:
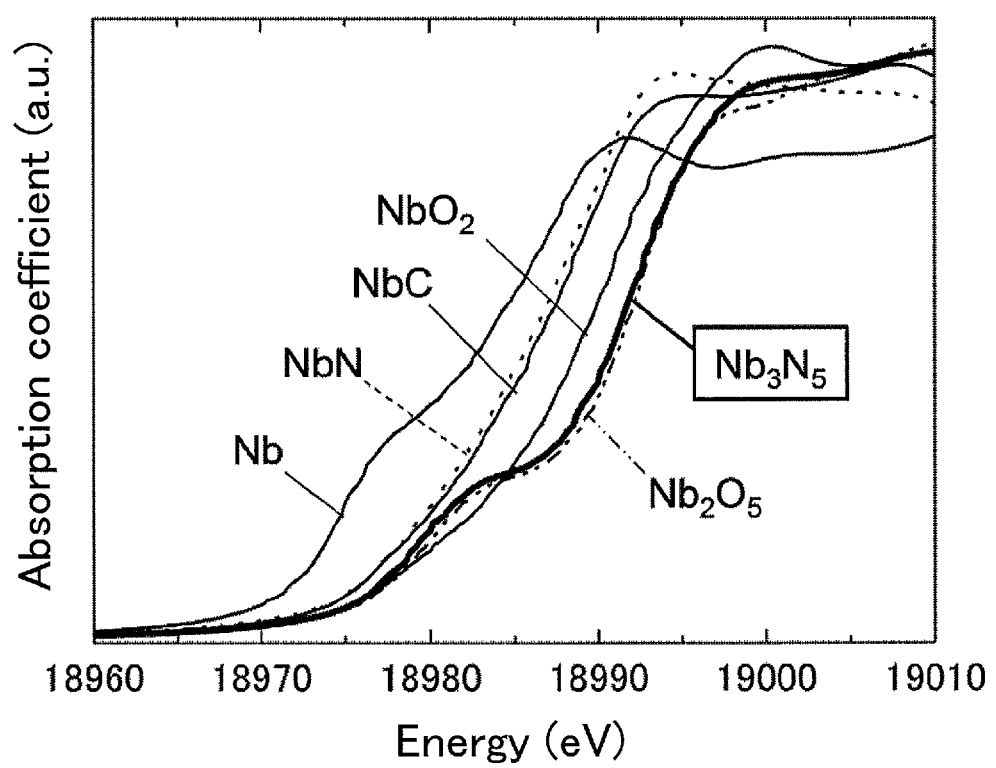
FIG. 14 shows an X-ray absorption near-edge structure (XANES) spectrum of $Nb_3N_5$ according to Example 1-1 of the present invention.

X-ray absorption fine structure (XAFS) analysis of the $Nb_3N_5$ powder produced in this example was performed. The XAFS spectrum is an absorption spectrum resulting from the excitation of inner shell electrons of a target element that occurs when the element is irradiated with X-rays. A region near the absorption edge of the XAFS spectrum is called an X-ray absorption near edge structure (XANES) spectrum. The XANES spectrum is sensitive to the valence of a target element, and generally, the higher the valence of the element is, the more the absorption edge position in the spectrum shifts toward the high energy side. FIG. 14 shows the XANES spectrum of the $Nb_3N_5$ produced in this example. It can be seen from FIG. 14 that for respective Nb compounds used as references, the absorption edge of the spectrum of a compound in which Nb has a higher valence shifts more toward the high energy side. Here, the absorption edge of the spectrum of the target $Nb_3N_5$ almost coincides with that of a niobium oxide ($Nb_2O_5$) in which Nb species has a valence of +5. This fact also means that Nb species contained in the sample has a valence of +5.

The above results show that the reduction of Nb in the $Nb_3N_5$ powder was prevented due to the effect of a nitridation temperature lower than that of the conventional nitridation and the state of $Nb^{5+}$ was maintained before and after the calcination under the ammonia gas flow.

Example 1-2

As a raw material, pentakis(dimethylamino)niobium ($Nb(N(CH_3)_2)_5$) was used.

Next, a $Nb_3N_5$-containing film was synthesized using the MOCVD apparatus 500 shown in FIG. 5. An ethylcyclohexane solution of the raw material 501 at 6.76×10$^{-6}$ Pa·m$^3$ s$^{-1}$ (0.04 sccm) was vaporized at 130° C. in the vaporizer 511. The nitrogen gas 502 was used as an inert gas. The ammonia 503 at 1.69×10$^{-3}$ Pa·m$^3$s$^{-1}$ (10 sccm) was mixed with a mixed gas at 1.69×10$^{-1}$ Pa·m$^3$s$^{-1}$ (1000 sccm) containing the source gas (vaporized raw material 501) and the nitrogen gas 502. The resulting gas mixture was injected for 12 hours from the shower head 514 to the substrate 521 (ITO film (with a thickness of 150 nm)/glass substrate) heated at 150° C. by the susceptor 515. Thus, a $Nb_3N_5$-containing film with a thickness of 140 nm was obtained.

Figure 15:
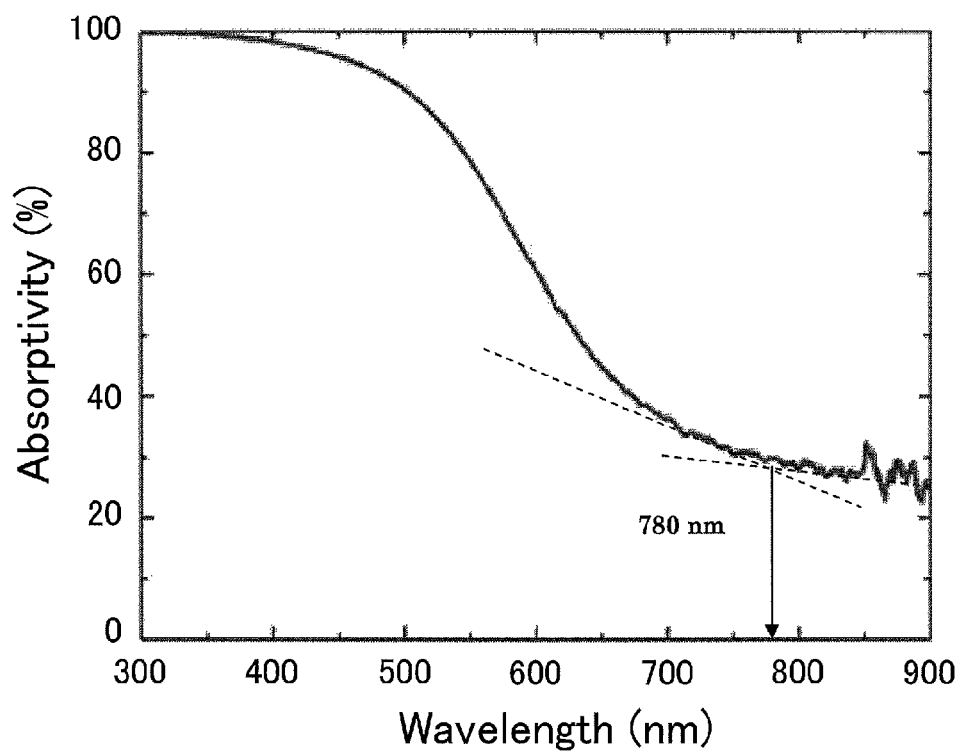
FIG. 15 shows an ultraviolet-visible absorption spectrum of a $Nb_3N_5$-containing film according to Example 1-2 of the present invention.

FIG. 15 shows the ultraviolet-visible absorption spectrum of the $Nb_3N_5$-containing film produced in this example. It was found from FIG. 15 that the resulting material can absorb visible light having a wavelength up to 780 nm. This demonstrated that the above material was a semiconductor with a band gap of 1.6 eV (the following formula 2). This measured value almost coincided with the band gap value (1.5 eV) of $Nb_3N_5$ estimated based on the result of the first-principles band calculation.

Band gap[eV]=1240/Absorption wavelength[eV]　　(Formula 2)

Example 1-3

Example 1-3 of the present invention is specifically described.

$Nb_3N_5$ synthesized in Example 1-1 was allowed to be loaded with platinum (Pt) as a co-catalyst thereon using the following method. $Nb_3N_5$ was impregnated with hexachloroplatinate (IV) ($H_2PtCl_6$) that is equivalent to 1 wt % of $Nb_3N_5$ in an aqueous solution, followed by drying in a steam bath. Thereafter, it was subjected to a hydrogen reduction treatment at 200° C. for 2 hours. Thus, Pt-loaded $Nb_3N_5$ was obtained.

Figure 16:
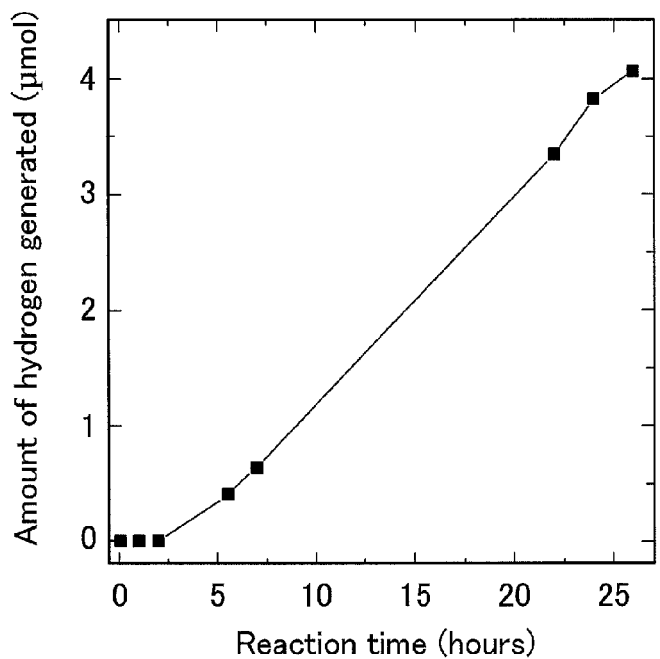
FIG. 16 shows a time course of the amount of hydrogen generated using $Nb_3N_5$ according to Example 1-3 of the present invention.

Pt-loaded $Nb_3N_5$ (0.20 g) was suspended in 200 mL of a 10 vol % methanol aqueous solution. FIG. 16 shows a time course of the amount of hydrogen generated under irradiation of this suspension with visible light having a wavelength of 420 nm to 800 nm. Using a 300-W xenon lamp as the light source, the light irradiation was performed through a cold mirror for blocking light other than the light having a wavelength of 420 nm to 800 nm. As a result, hydrogen was generated at a maximum generation rate of 0.24 µmol hour$^{-1}$ as shown in FIG. 16. It was confirmed from this that Pt-loaded $Nb_3N_5$ had a photocatalytic function for reducing protons in the methanol aqueous solution to hydrogen under irradiation with visible light.

Comparative Example 1-1

Pt-loaded $Nb_3N5$ (0.20 g) was suspended in 200 mL of a 10 vol % methanol aqueous solution in the same manner as in Example 1-3. The amount of hydrogen generated in this suspension placed in a dark place was measured. However, even after 7 hours from the start, no hydrogen was detected. This proved that the hydrogen evolution reaction in the suspension in Example 1-3 proceeded by the function of $Nb_3N_5$ as a photocatalyst.

Example 1-4

$Nb_3N_5$ synthesized in Example 1-1 was allowed to be loaded with iridium oxide ($IrO_2$) as a co-catalyst using the following method. $Nb_3N_5$ was suspended in an aqueous solution containing iridium (IV)-oxide dihydrate ($IrO_2 \cdot 2H_2O$) colloid that is equivalent to 5 wt % of $Nb_3N_5$, so that the iridium (IV)-oxide dihydrate colloid was adsorbed on the surface of the $Nb_3N_5$. Thereafter, it was filtered, washed with water, and then subjected to a calcination treatment at 150° C. in vacuum. Thus, $IrO_2$-loaded $Nb_3N_5$ was obtained.

Figure 17:
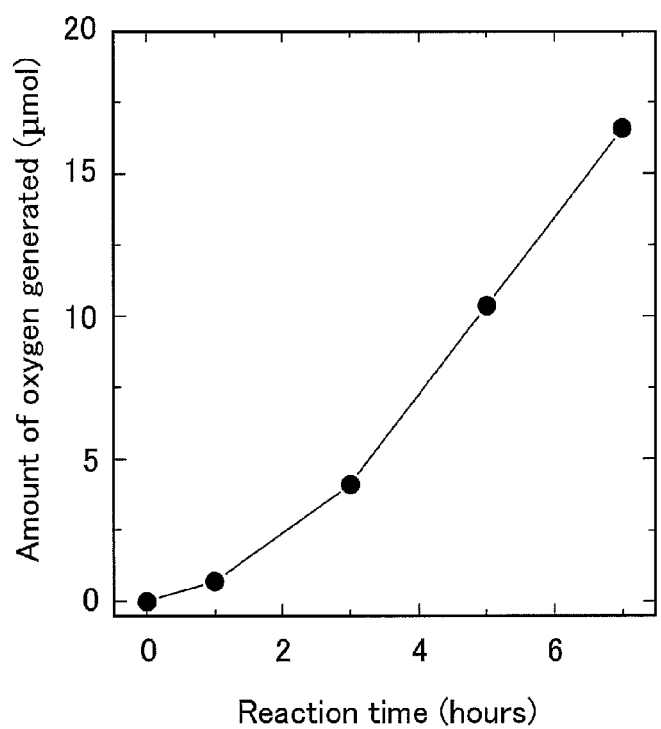
FIG. 17 shows a time course of the amount of oxygen generated using $Nb_3N_5$ according to Example 1-4 of the present invention.

$IrO_2$-loaded $Nb_3N_5$ (0.20 g) was suspended in 200 mL of a 0.01M (mol L$^{-1}$) silver nitrate aqueous solution. FIG. 17 shows a time course of the amount of oxygen generated under irradiation of this suspension with ultraviolet light. The light irradiation was performed using a 450-W high-pressure mercury lamp as the light source. As a result, oxygen was generated at a maximum generation rate of 3.1 µmol hour$^{-1}$ as shown in FIG. 17. It was confirmed from this that $Nb_3N_5$ had a photocatalytic function for oxidizing water in the silver nitrate aqueous solution to oxygen under irradiation with light.

Comparative Example 1-2

$IrO_2$-loaded $Nb_3N5$ (0.20 g) was suspended in 200 mL of a 0.01M (mol L$^{-1}$) silver nitrate aqueous solution in the same manner as in Example 1-4. The amount of oxygen generated in this suspension placed in a dark place was measured. However, even after 3.5 hours from the start, no oxygen was detected. This proved that the oxygen evolution reaction in the suspension in Example 4 proceeded by the function of $Nb_3N_5$ as a photocatalyst.

Example 2

In Example 2, an example in which a compound represented by the composition formula $R^1N=Nb(NR^2R^3)_3$ was used as an organic niobium compound that is a starting material is described.

Example 2-1

Synthesis of $Nb_3N_5$-Containing Film

As a raw material ($R^1N=Nb(NR^2R^3)_3$), tertiary-butylimino tris-(ethylmethylamino)niobium (($CH_3)_3CN=Nb(N(C_2H_5)CH_3)_3$) was used. The reduction onset temperature of Nb in this raw material was determined based on the TG-DTA data thereof. As a result, the reduction temperature of Nb in this raw material was about 303° C.

Next, a $Nb_3N_5$-containing film was synthesized using the MOCVD apparatus 500 shown in FIG. 5. An ethylcyclohexane solution of the raw material 501 at $6.76 \times 10^{-6}$ Pa·m$^3$ s$^{-1}$ (0.04 sccm) was vaporized at 150° C. in the vaporizer 511. The nitrogen gas 502 was used as an inert gas. The ammonia 503 at rates of 0 Pa·m$^3$s$^{-1}$ (0 sccm), $1.69 \times 10^{-4}$ Pa·m$^3$ s$^{-1}$ (1 sccm), $8.45 \times 10^{-4}$ Pa·m$^3$ s$^{-1}$ (5 sccm), and $1.69 \times 10^{-3}$ Pa·m$^3$ s$^{-1}$ (10 sccm) each were mixed with a mixed gas at $1.69 \times 10^{-1}$ Pa·m$^3$s$^{-1}$ (1000 sccm) containing the source gas (vaporized raw material 501) and the nitrogen gas 502. The resulting gas mixture was injected for 6 hours from the shower head 514 to the substrate 521 (ITO film (with a thickness of 150 nm)/glass substrate) heated at 300° C. by the susceptor 515. Thus, a film 1A (ammonia: 0 sccm), a film 1B (ammonia: 1 sccm), a film 1C (ammonia: 5 sccm), and a film 1D (ammonia: 10 sccm) each with a thickness of 200 nm were obtained.

<Identification of $Nb_3N_5$-Containing Film>

Figure 18:
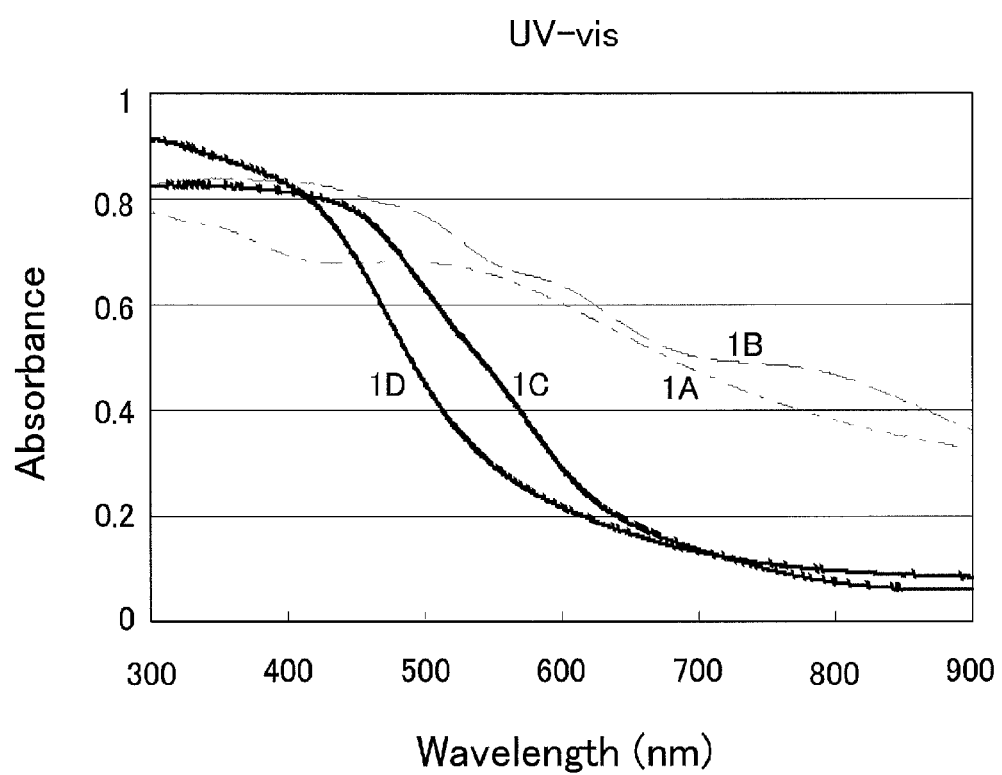
FIG. 18 shows ultraviolet-visible absorption spectra of films 1A to 1D according to Example 2-1 of the present invention.
Figure 19:
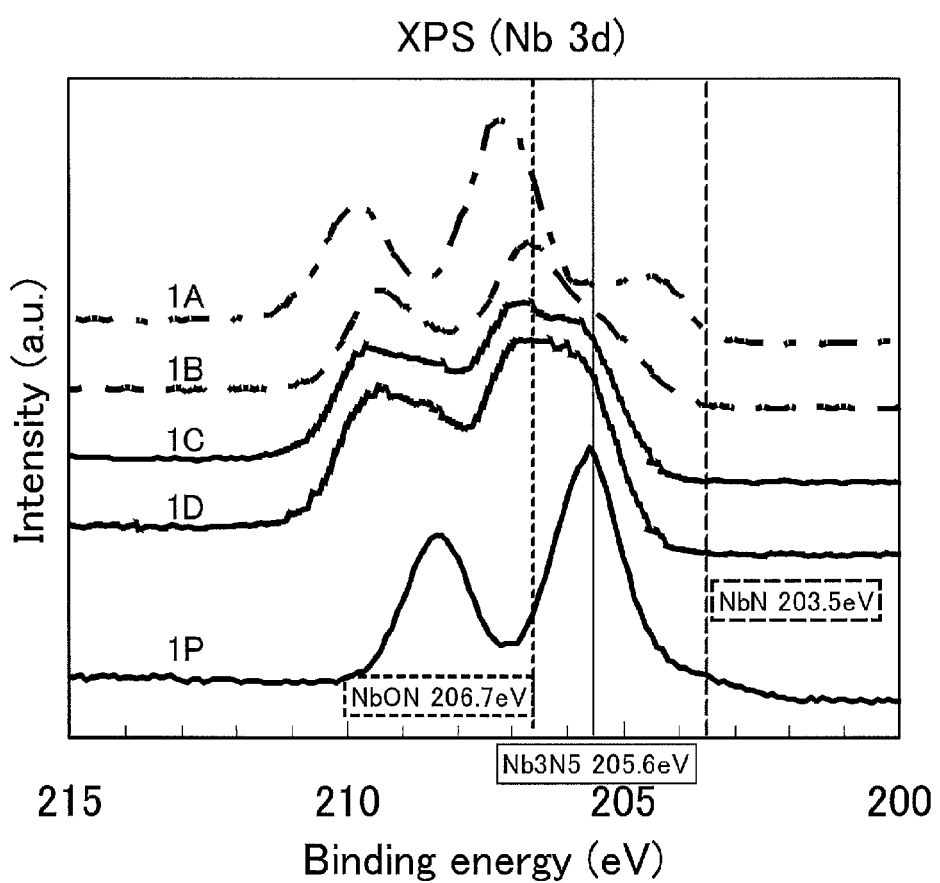
FIG. 19 shows X-ray photoelectron spectra of Nb 3d in the films 1A to 1D according to Example 2-1.

FIG. 18 shows the ultraviolet-visible absorption spectra of the films 1A to 1D. The absorption edges of 1A to 1D are considered to be about 780 nm from the ultraviolet-visible absorption spectra thereof. FIG. 19 shows the X-ray photoelectron spectra of Nb 3d in the films 1A to 1D and the $Nb_3N_5$ powder (referred to as "1P") synthesized in Example 1-1. It can be seen from FIG. 19 that the peak at 205.6 eV on the low energy side, which is considered to be the peak of $Nb_3N_5$, increases as the amount of ammonia increases (from 1A to 1D). As a result, it was confirmed that the films 1B to 1D contained $Nb_3N_5$, that is, they were $Nb_3N_5$-containing films.

In this example, the ammonia flow rates during the synthesis of the $Nb_3N_5$-containing films were 0 to $1.69 \times 10^{-3}$ Pa·m$^3$s$^{-1}$ (0, 1, 5, and 10 sccm). It was confirmed that the $Nb_3N_5$-containing film was also synthesized when the ammonia flow rate was higher than the above rates, although the film forming rate was lower.

Example 2-2

A $Nb_3N_5$ powder was synthesized using the apparatus 100 shown in FIG. 3. The raw material 101 was set in the boat 113 in the quartz tube 112 with an inner diameter of 25 mm in the tube furnace 111. As the raw material 101, the same tertiary-butylimino tris-(ethylmethylamino)niobium (($CH_3)_3CN=Nb(N(C_2H_5)CH_3)_3$) was used as in Example 2-1. This raw material 101 was heated at 300° C. for 4 hours under an ammonia flow at $1.69 \times 10^{-1}$ Pa·m$^3$s$^{-1}$ (1000 sccm). Thus, a powder 2 was obtained.

This powder 2 was subjected to elemental analysis, and it was found that the powder 2 consisted only of Nb and N, and the ratio of the number of Nb atoms and that of N atoms (Nb/N) was 3.0/4.9. This result indicated that $Nb_3N_5$ was produced. The X-ray photoelectron spectrum of the powder 2 was compared with the X-ray photoelectron spectrum of the $Nb_3N_5$ powder of Example 1-1. As a result, it was confirmed that these data almost coincided with each other. It was thus confirmed that the powder 2 was a $Nb_3N_5$-containing material.

In this example, the ammonia flow rate during the synthesis of the $Nb_3N_5$-containing material was $1.69 \times 10^{-1}$ Pa·m$^3$ s$^{-1}$ (1000 sccm). It was confirmed that the $Nb_3N_5$-containing material was also synthesized when the ammonia flow rate was in the range of 10 sccm to 1000 sccm, although the production rate was low. It was confirmed that the $Nb_3N_5$-containing material was also synthesized when the ammonia flow rate was 1000 sccm or higher, although the production rate was unchanged.

Example 2-3

As a raw material ($R^1N=Nb(NR^2R^3)_3$), tertiary-butylimino tris-(diethylamino)niobium (($CH_3)_3CN=Nb(N(C_2H_5)_2)_3$) was used. The reduction onset temperature of Nb in this raw material was determined based on the TG-DTA data thereof, in the same manner as in Example 2-1. As a result, the reduction onset temperature of Nb in this raw material was about 410° C.

Next, a $Nb_3N_5$-containing film was synthesized using the MOCVD apparatus 500 shown in FIG. 5. An ethylcyclohexane solution of the raw material 501 at $6.76 \times 10^{-6}$ Pa·m$^3$s$^{-1}$ (0.04 sccm) was vaporized at 150° C. in the vaporizer 511. The nitrogen gas 502 was used as an inert gas. The ammonia 503 at $1.69 \times 10^{-3}$ Pa·m$^3$s$^{-1}$ (10 sccm) was mixed with a mixed gas at $2.87 \times 10^{-1}$ Pa·m$^3$s$^{-1}$ (1700 sccm) containing the source gas (vaporized raw material 501) and the nitrogen gas 502. The resulting gas mixture was injected for 6 hours from the shower head 514 to the substrate 521 (ITO film (with a thickness of 150 nm)/glass substrate) heated at 400° C. by the susceptor 515. Thus, a film 3 with a thickness of 300 nm was obtained.

The X-ray photoelectron spectrum of Nb $3d$ in this film 3 was measured. The peak of Nb $3d$ was observed at 205.6 eV on the low energy side. It was confirmed from this result that the film 3 was a $Nb_3N_5$-containing film.

Example 2-4

As a raw material ($R^1N=Nb(NR^2R^3)_3$), tertiary-butylimino tris-(dimethylamino)niobium (($CH_3)_3CN=Nb(N(CH_3)_2)_3$) was used. The reduction onset temperature of Nb in this raw material was determined based on the TG-DTA data thereof, in the same manner as in Example 2-1. As a result, the reduction onset temperature of Nb in this raw material was about 250° C.

Next, a $Nb_3N_5$-containing film was synthesized using the MOCVD apparatus 500 shown in FIG. 5. An ethylcyclohexane solution of the raw material 501 at $6.76 \times 10^{-6}$ Pa·m$^3$ s$^{-1}$ (0.04 sccm) was vaporized at 150° C. in the vaporizer 511. The nitrogen gas 502 was used as an inert gas. The ammonia 503 at $1.69 \times 10^{-3}$ Pa·m$^3$s$^{-1}$ (10 sccm) was mixed with a mixed gas at $2.87 \times 10^{-1}$ Pa·m$^3$s$^{-1}$ (1700 sccm) containing the source gas (vaporized raw material 501) and the nitrogen gas 502. The resulting gas mixture was injected for 6 hours from the shower head 514 to the substrate 521 (ITO film (with a thickness of 150 nm)/glass substrate) heated at 240° C. by the susceptor 515. Thus, a film 4 with a thickness of 500 nm was obtained.

The X-ray photoelectron spectrum of Nb $3d$ in this film 4 was measured. The peak of Nb $3d$ was observed at 205.6 eV. It was confirmed from this result that the film 4 was a $Nb_3N_5$-containing film.

Example 2-5

<Fabrication of Hydrogen Generation Device>

As an example of the hydrogen generation device of the present invention, a hydrogen generation device having the same configuration as that of the hydrogen generation device 900 shown in FIG. 9 was fabricated. The configuration of the hydrogen generation device of the present embodiment is described with reference to FIG. 9. As shown in FIG. 9, the hydrogen generation device 900 of Example 2-5 included a rectangular glass container 990 with openings in the upper part, a photocatalyst electrode 920, a conductive substrate 910, and a counter electrode 930. The glass container 990 contained 1 mol L$^{-1}$ of $H_2SO_4$ aqueous solution as the electrolytic solution 960. As the photocatalyst electrode 920, a 1-cm-square electrode, which was fabricated in Example 2-1, in which the 200-nm-thick film 1D was provided on the substrate 521 (ITO film (with a thickness of 150 nm)/glass substrate) (corresponding to the conductive substrate 910), was used. The photocatalyst electrode 920 was disposed so that the surface thereof faced the light incident surface 950 of the glass container 990. A platinum plate was used as the counter electrode 930. The conductive substrate 910 and the counter electrode 930 were electrically connected by the conducting wire 970. The current flowing between the photocatalyst electrode 920 and the counter electrode 930 was measured with an ammeter.

<Simulated Sunlight Irradiation Experiment>

A solar simulator manufactured by SERIC Ltd. was used to apply simulated sunlight. The surface of the photocatalyst electrode 920 was irradiated with light at an intensity of 1 kW/m$^2$ through the light incident portion 950 of the hydrogen generation device 900 of Example 2-5. The gas generated on the surface of the counter electrode 930 was collected for 60 minutes, and the components of the collected gas were analyzed and the amount of the gas generated was measured by gas chromatography. The photocurrent flowing between the photocatalyst electrode 920 and the counter electrode 930 was measured with an ammeter. The apparent quantum efficiency was calculated using the amount of the gas generated in the counter electrode 930. About 59 μL of oxygen was generated from the photocatalyst electrode 920, and about 121 μL of hydrogen was generated from the counter electrode 930. About 0.19 mA photocurrent was observed, and thus the calculated apparent quantum efficiency was about 2%.

It was confirmed from these results that the $Nb_3N_5$-containing film used in this example had optical semiconductor properties for generation of hydrogen and oxygen by decomposition of water under light irradiation.

Industrial Applicability

Since the $Nb_3N_5$ of the present invention can be used as a semiconductor material, high efficient hydrogen generation can be achieved by utilizing sunlight. Hydrogen thus obtained can be used as a fuel for fuel cells, for example.

The invention claimed is:

1. A photocatalyst consisting of an optical semiconductor containing a niobium nitride which has a composition represented by the composition formula $Nb_3N_5$ and in which a constituent element Nb has a valence of substantially +5.

2. A hydrogen generation device comprising:
the photocatalyst according to claim 1;
an aqueous solution containing an electrolyte and being in contact with the photocatalyst; and
a container containing the photocatalyst and the aqueous solution, wherein
hydrogen is generated through decomposition of water in the aqueous solution by irradiation of the photocatalyst with light.

3. An energy system comprising:
the hydrogen generation device according to claim 2;
a fuel cell; and
a line for supplying the hydrogen generated in the hydrogen generation device to the fuel cell.

4. A photocatalyst consisting of a niobium nitride-containing film containing a niobium nitride which has a composition represented by the composition formula $Nb_3N_5$ and in which a constituent element Nb has a valence of substantially +5.

5. A hydrogen generation device comprising:
the photocatalyst according to claim 4;
an aqueous solution containing an electrolyte and being in contact with the photocatalyst; and
a container containing the photocatalyst and the aqueous solution, wherein
hydrogen is generated through decomposition of water in the aqueous solution by irradiation of the photocatalyst with light.

6. An energy system comprising:
the hydrogen generation device according to claim 5;
a fuel cell; and
a line for supplying the hydrogen generated in the hydrogen generation device to the fuel cell.

* * * * *